(12) United States Patent
Gordon

(10) Patent No.: US 12,400,308 B2
(45) Date of Patent: Aug. 26, 2025

(54) METHOD AND APPARATUS FOR IDENTIFYING CHARACTERISTICS OF TRADING CARDS

(71) Applicant: TCG MACHINES INC., Calgary (CA)

(72) Inventor: Graeme Frederick Gordon, Calgary (CA)

(73) Assignee: TCG Machines Inc., Calgary (CA)

( * ) Notice: Subject to any disclaimer, the term of this patent is extended or adjusted under 35 U.S.C. 154(b) by 374 days.

(21) Appl. No.: 18/000,024

(22) PCT Filed: May 28, 2021

(86) PCT No.: PCT/CA2021/000048
§ 371 (c)(1),
(2) Date: Nov. 28, 2022

(87) PCT Pub. No.: WO2021/237332
PCT Pub. Date: Dec. 2, 2021

(65) Prior Publication Data
US 2023/0222641 A1    Jul. 13, 2023

Related U.S. Application Data

(60) Provisional application No. 63/032,495, filed on May 29, 2020.

(30) Foreign Application Priority Data

May 29, 2020  (CA) .............................. CA 3081739

(51) Int. Cl.
| G06T 7/00 | (2017.01) |
| B07C 5/342 | (2006.01) |
| G06T 7/13 | (2017.01) |

(52) U.S. Cl.
CPC .......... *G06T 7/0002* (2013.01); *B07C 5/3422* (2013.01); *G06T 7/13* (2017.01)

(58) Field of Classification Search
CPC .... G06T 7/0002; G06V 10/273; G06V 10/56; G07D 7/20; G07D 7/205; B07C 5/3422
See application file for complete search history.

(56) References Cited

U.S. PATENT DOCUMENTS

| 4,899,392 | A |   | 2/1990 | Merton |
| 5,133,019 | A | * | 7/1992 | Merton ................. G07D 5/005 356/600 |

(Continued)

FOREIGN PATENT DOCUMENTS

| EP | 21812035 | 5/2024 |
| JP | 2007-249656 | 9/2007 |

(Continued)

OTHER PUBLICATIONS

Gordon, U.S. Appl. No. 63/032,495, filed May 29, 2020, titled "Method and Apparatus for Identifying Characteristics of Trading Cards", 62 pages.

*Primary Examiner* — Michael Robert Cammarata
(74) *Attorney, Agent, or Firm* — Wells St. John P.S.

(57) ABSTRACT

Methods and apparatuses for detecting characteristics of a card include a method for identifying a card containing foil, the foil detection method comprising converting an image file depicting a card into a hue, saturation, value ("HSV") colour space, applying a value mask to exclude a group of pixels from analysis that do not form an intensified brightness area, and comparing the number of remaining pixels against a threshold to determine whether the card contains foil. In another aspect, a method for assigning a condition grading to a card comprises converting an image file depicting a diffusely illuminated card into an HSV colour space, isolating a uniform portion of the converted image file, (Continued)

applying a value mask to the converted image file to exclude pixels forming an undamaged portion of the card, and comparing the number of remaining pixels to a plurality of grading thresholds to assign a condition grading.

38 Claims, 24 Drawing Sheets

(56) References Cited

U.S. PATENT DOCUMENTS

| | | | |
|---|---|---|---|
| 5,220,614 A * | 6/1993 | Crain | G06T 7/73 |
| | | | 382/136 |
| 5,224,176 A | 6/1993 | Crain | |
| 5,966,673 A | 10/1999 | Shannon, Sr. | |
| 6,307,576 B1 | 10/2001 | Rosenfeld | |
| 9,767,163 B2 | 9/2017 | Kass et al. | |
| 10,146,841 B2 | 12/2018 | Kass et al. | |
| 10,445,330 B2 | 10/2019 | Kass et al. | |
| 10,459,931 B2 | 10/2019 | Kass et al. | |
| 10,942,933 B2 | 3/2021 | Kass et al. | |
| 11,003,958 B2 | 5/2021 | Dasari et al. | |
| 2005/0197853 A1 * | 9/2005 | Ueno | G06Q 30/06 |
| | | | 705/26.1 |
| 2016/0210734 A1 | 7/2016 | Kass et al. | |
| 2018/0004756 A1 | 1/2018 | Kass et al. | |
| 2018/0246894 A1 | 8/2018 | Kass et al. | |
| 2018/0246895 A1 * | 8/2018 | Kass | G06F 16/5838 |
| 2019/0080127 A1 * | 3/2019 | Yoshida | G06F 3/04162 |
| 2019/0392262 A1 * | 12/2019 | Dasari | G06T 7/0004 |
| 2020/0057769 A1 | 2/2020 | Kass et al. | |
| 2021/0065353 A1 * | 3/2021 | Potter | G06Q 30/0278 |
| 2021/0200777 A1 | 7/2021 | Kass et al. | |
| 2022/0286571 A1 * | 9/2022 | Hurst | B07C 5/3422 |
| 2022/0374946 A1 * | 11/2022 | Kass | G06T 7/70 |
| 2023/0222641 A1 | 7/2023 | Gordon | |
| 2023/0325392 A1 * | 10/2023 | Kass | G07D 7/20 |

FOREIGN PATENT DOCUMENTS

| | | | |
|---|---|---|---|
| JP | 2009-133743 | 6/2009 | |
| JP | 2023-516636 | 1/2025 | |
| WO | WO-03005291 A1 * | 1/2003 | B42D 25/00 |
| WO | WO PCT/CA2021/000048 | 11/2022 | |

* cited by examiner

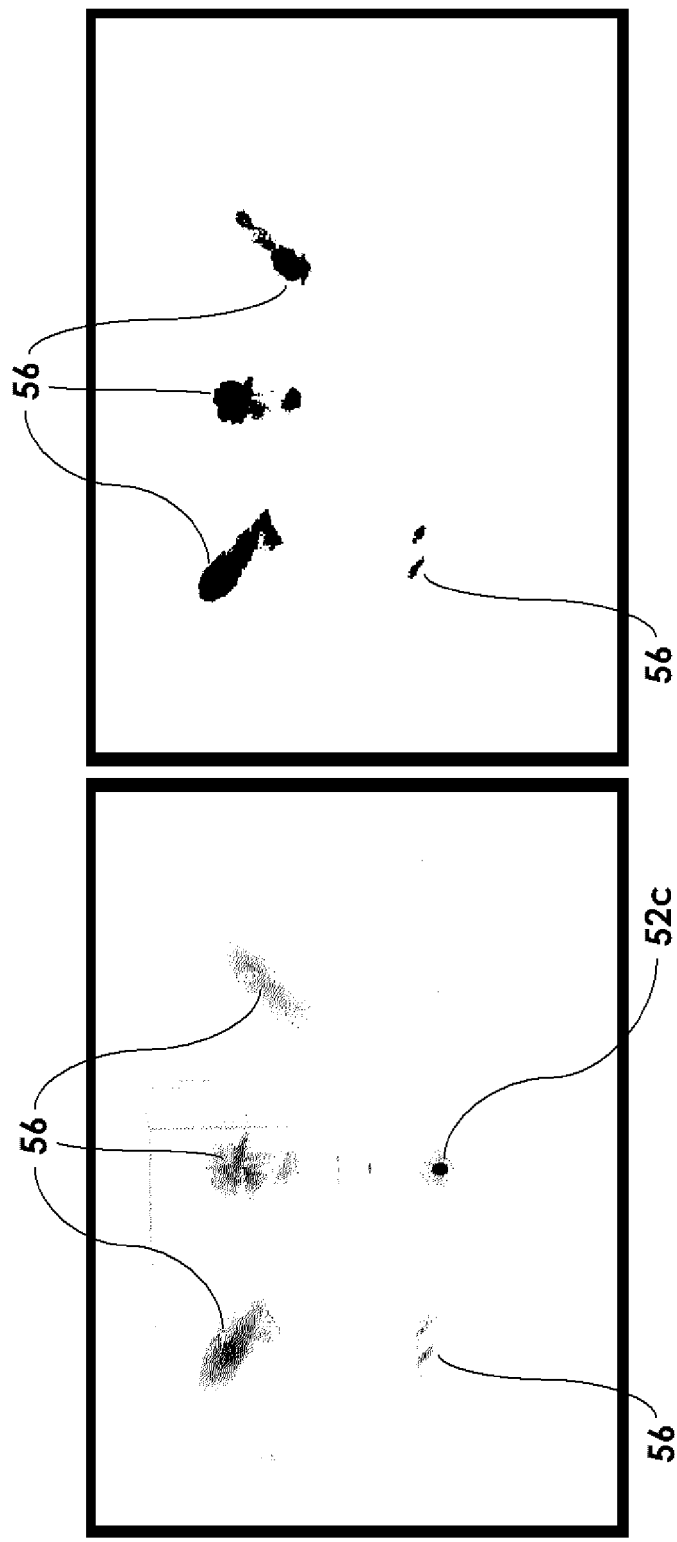

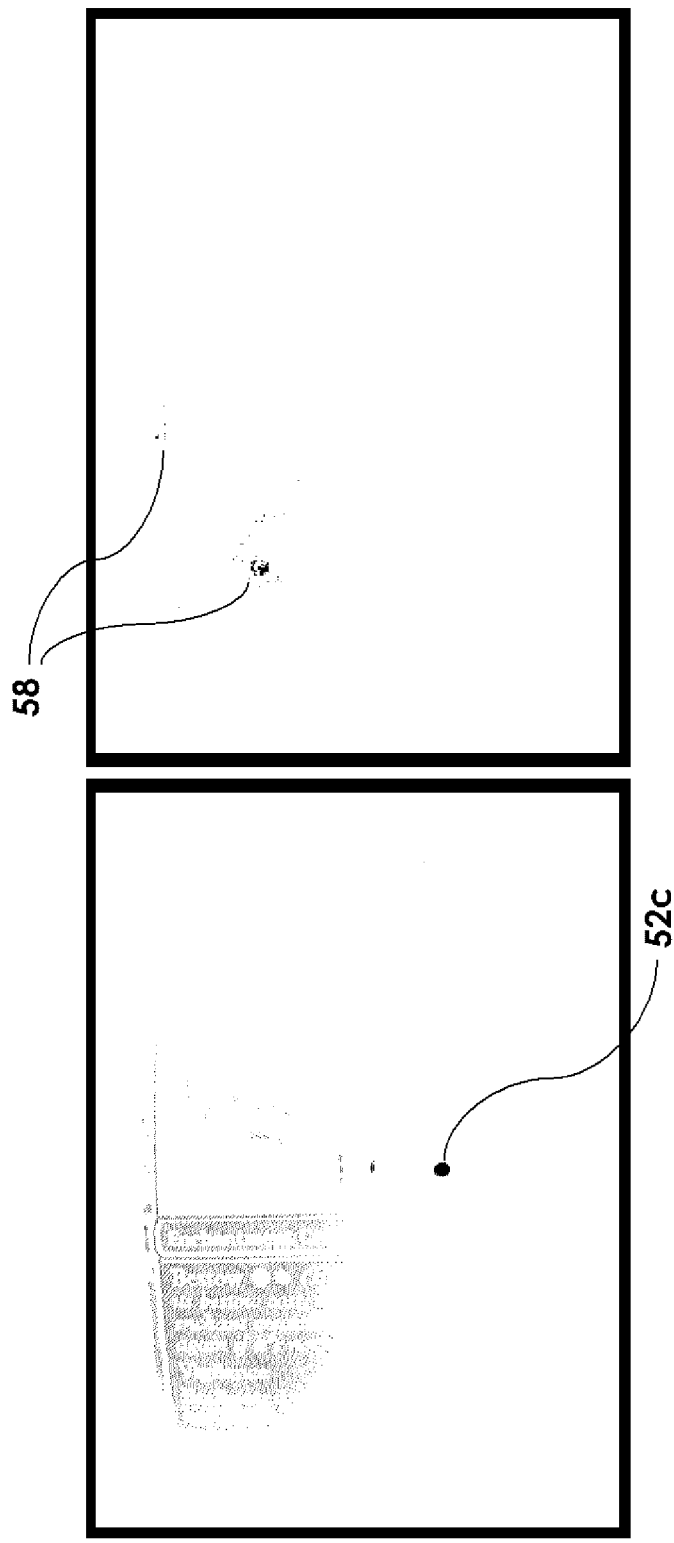

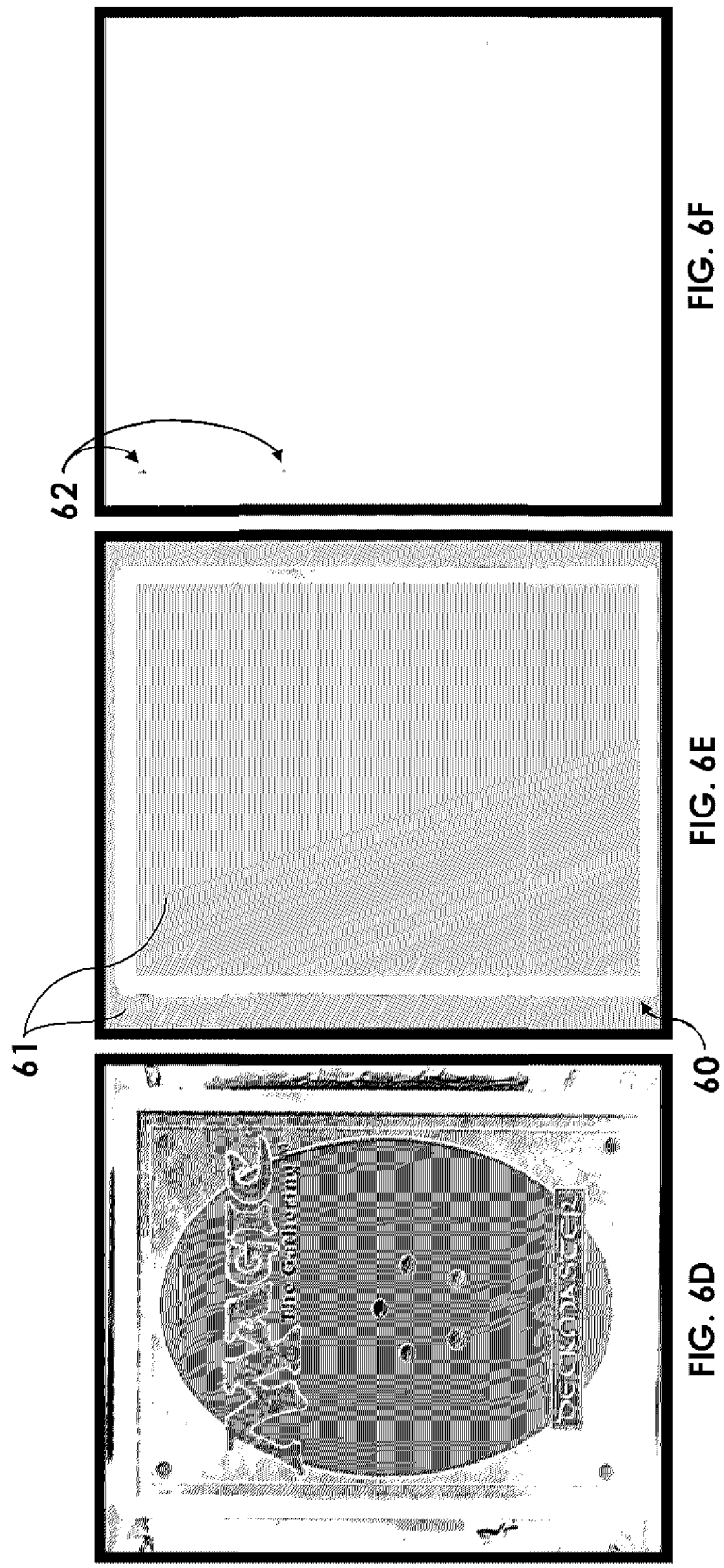

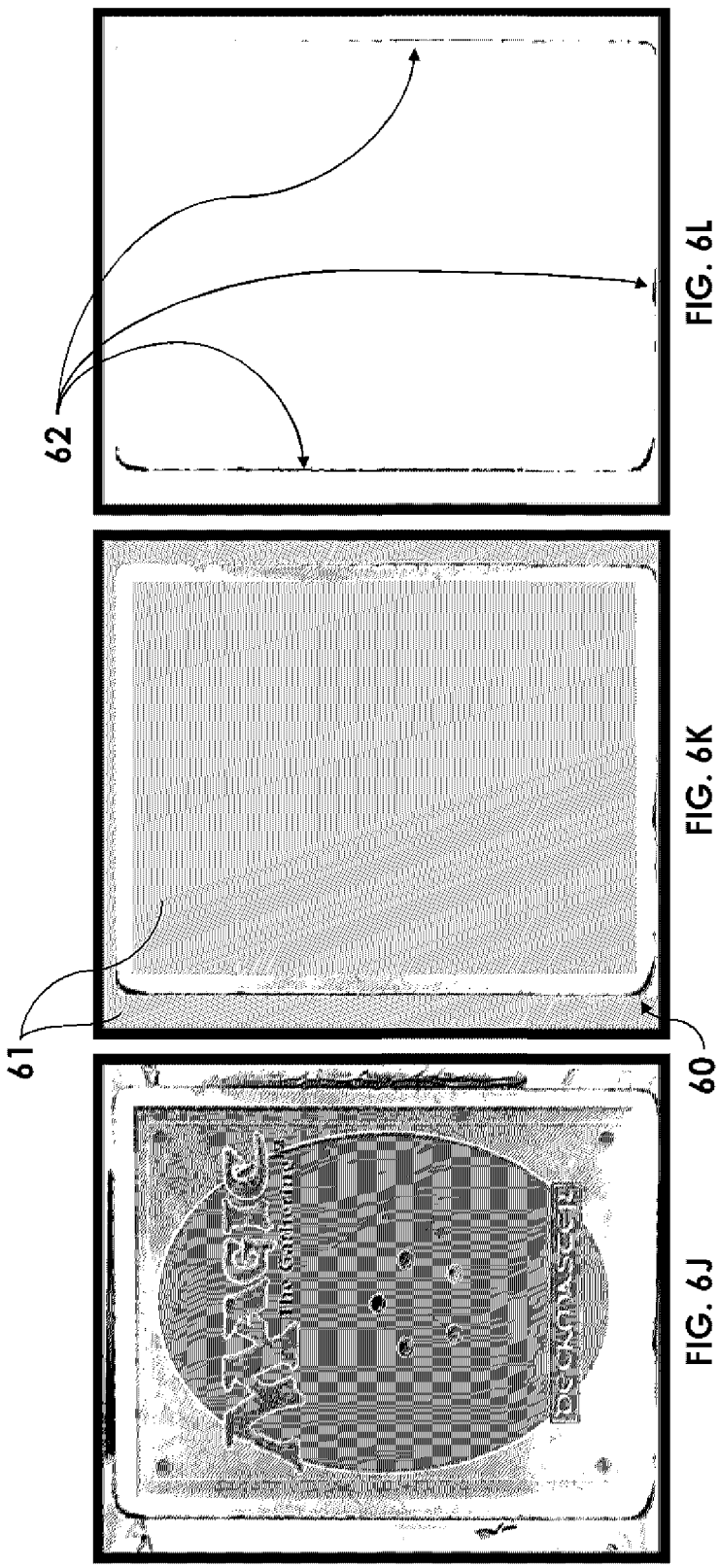

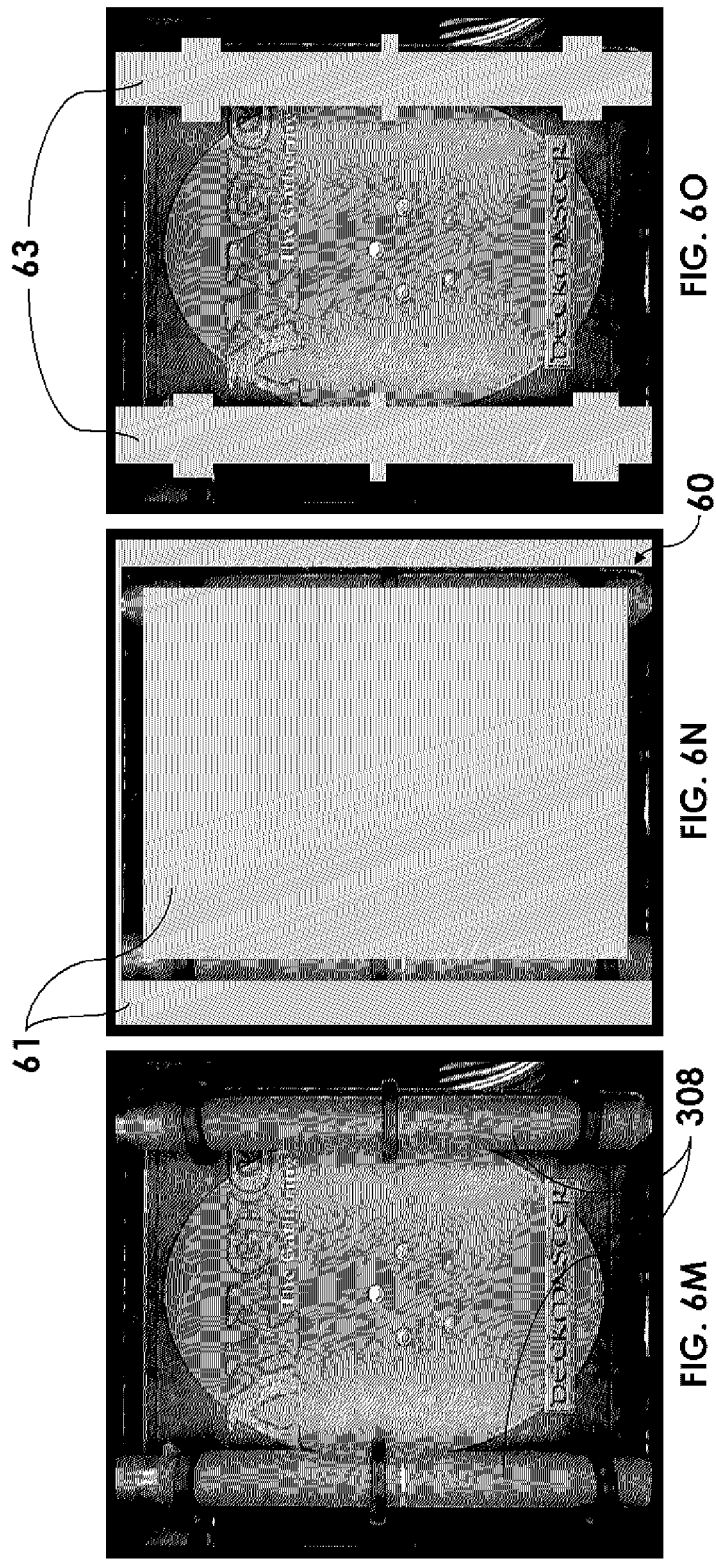

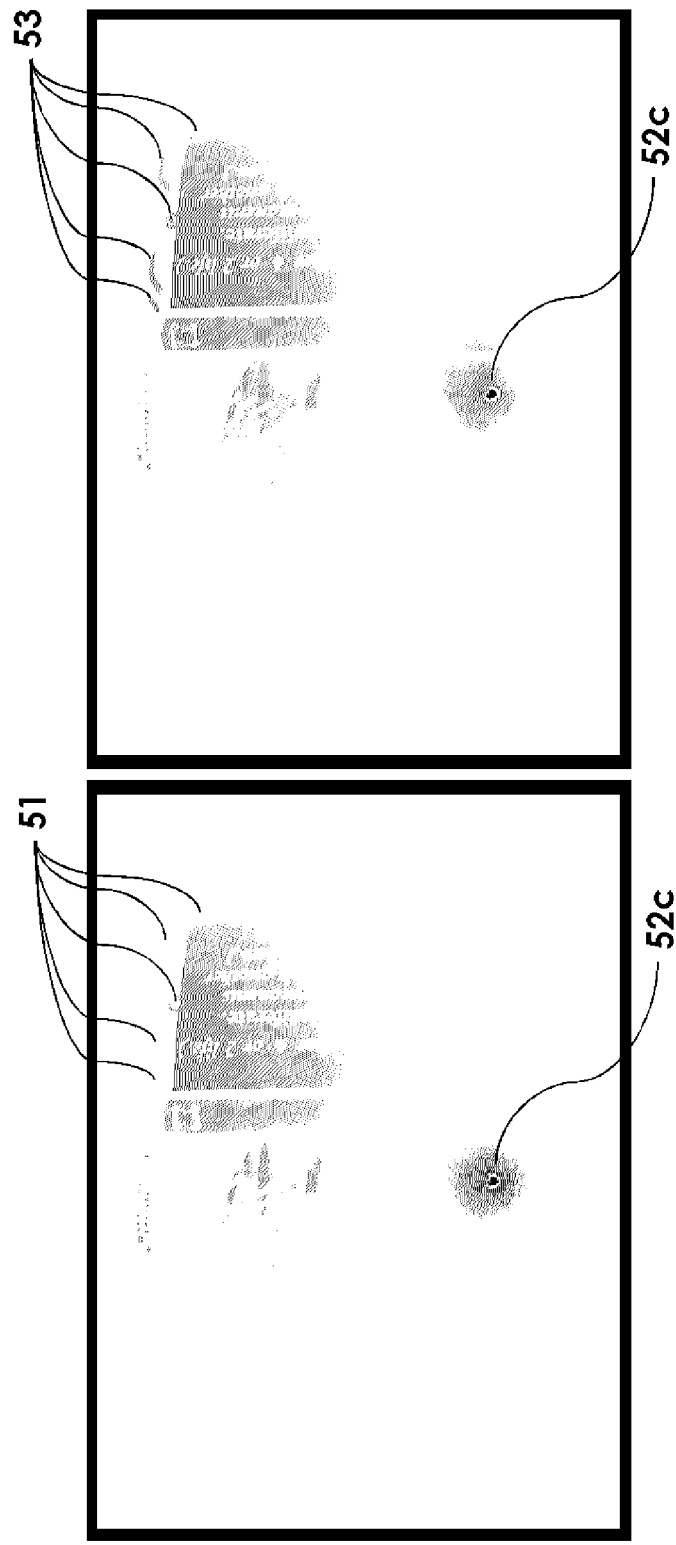

METHOD AND APPARATUS FOR IDENTIFYING CHARACTERISTICS OF TRADING CARDS

FIELD

The present disclosure relates to methods and apparatuses for identifying and sorting trading cards according to identified characteristics of the card; in particular, the present disclosure relates to methods and apparatuses for identifying foil trading cards and for assigning a condition grading to a trading card and sorting the cards based on those identified characteristics.

BACKGROUND

Collecting and trading cards is a popular hobby. Examples of different types of trading cards include, but are not limited to, Pokemon™ trading cards, Magic: The Gathering™ trading cards, and trading cards for sports teams, such as National Hockey League™ or Major League Baseball™ trading cards. A market for trading cards exists, whereby collectors may sell or trade their trading cards with others. The value of a particular trading card is based on the characteristics of that trading card. For an example, the literary and graphical content of the trading card, and its rarity compared to other cards, will impact the card's value.

Additionally, the condition of a trading card is an important factor of the card's value. For example, two copies of the exact same trading card may have different valuations based on the condition of each card. For example, if one card is in mint or near-mint condition, meaning that the card has not experienced any wear or damage, the mint or near-mint card will be more valuable than a card that is in a played or damaged condition, meaning that the card has experienced wear and tear damage or other damage over time. Another trading card characteristic that impacts the card's value is whether the card is a foil card. Certain cards may include a special foil layer, which imparts a holographic look to the card under lighting conditions. Foil cards are rarer, and typically assessed at a higher value, than non-foil cards.

Trading card dealers may receive large volumes of used trading cards, which need to be sorted, categorized and valuated so that they can be sold in the trading card marketplace. Manually sorting the trading cards, for example, to separate the foil cards from the non-foil cards, can be a tedious and time-consuming process. Furthermore, manually evaluating the condition of a plurality of trading cards so as to assign a value to the card can also be a time-consuming process. A further issue with the manual grading of a trading card's condition is that the process involves subjectivity, depending on a number of factors including the particular individual who is grading the condition of the card, the lighting conditions under which the assessment is made, and the necessity of exercising individual skill and judgment in applying the criteria for grading a card's condition. The assessment of a card's condition typically involves noting any damage to the card, caused either by accident or normal wear and tear, including but not limited to bends, tears or folds in the card, scuff marks or scratches on the card's surface, fading due to exposure to sunlight, and attempts to alter or fix the card so as to improve its appearance. An element of subjectivity is also introduced by the fact that the condition between trading cards can be quite variable, and it is difficult for an individual to consistently apply the same criteria to each and every trading card when deciding on which condition grading should be assigned to a particular card. As such, there is a need for a more objective method of assessing and grading the condition of a trading card.

To the applicant's knowledge, the prior art includes previous attempts to automate the grading of collectible objects. In one patent application, of which the applicant is aware, publication number US 2016/0210734 A1 to Kass et al discloses a computerized system and method, using digital imaging devices and processes, to provide an objective, standardized, high resolution grading of collectible objects, such as trading cards. The system and methods described in Kass includes obtaining high-resolution images of a trading card, and comparing those high-resolution images to a reference image, referred to in Kass as a "Golden Image". The Golden Image is supplied by the manufacturer of the trading card. In one aspect of the Kass reference, an image subtraction routine is applied whereby all data points on a Golden Image may be utilized to eliminate all identical data points on the front and back of the collectible card under analysis. The data that remains on the front or back of the trading card, after the elimination has occurred, is thereby determined to be one or more defects. In another aspect of the Kass reference, blob analysis employs mathematical methods to detect regions in a digital image that differ in properties, such as brightness or colour, compared to areas surrounding those regions. A blob is a region of a digital image in which some properties are constant or which vary within a prescribed range of values. Blob analysis, in Kass, is utilized to identify, quantify, and measure individual defects and the cumulative total defects area.

In another prior art reference of which the applicant is aware, U.S. Pat. No. 4,899,392 to Merton, a method and system for accurately and objectively evaluating the numismatic quality of a coin for purposes of identification is disclosed. In the Merton reference, central to the grading aspect of that invention is the exact numerical evaluation of any detracting marks on each side of the coin. In particular, each detracting mark on the coin is identified, located and measured. An assigned quantity, representative of the detracting significance of each mark, is then calculated by adjusting the measured surface area of the detracting mark by a factor representative of the relative grading importance of the area on the coin where the detracting mark is located.

While the systems and methods for automated grading, described in the Kass and Merton references, may be usefully employed for grading highly valuable trading cards and other collectibles, such systems and methods do not easily accomplish assigning a rough grading category to a large volume of trading cards to be processed within a relatively short timeframe. For example, in the trading card business for playing cards, such as Pokémon™ and Magic: The Gathering™ trading cards, although there is a differentiation in the value of these cards based on their condition, it is typically not the case that such cards have an excessively high value in the hundreds or thousands of dollars for a single card, as may be the case in other types of trading card collectibles, such as vintage sport trading cards. Thus, there is a need in the industry for an objective and automated assignment of condition grading that can be applied to a large volume of trading cards within a relatively short period of time, so as to enable businesses to efficiently process and evaluate large batches of trading cards. Furthermore, as mentioned previously, there is a need in the industry for efficiently and automatically identifying foil cards and distinguishing them from non-foil cards.

SUMMARY

In one aspect of the present disclosure, detection of a card containing foil, as distinguished from a non-foil card, is accomplished by generating an image of the card illuminated by a light source, for example, a point light source. The point light source, which may include a light emitting diode ("LED") light source, will cause the resulting image to include a principal maxima interference pattern or a bright direct reflection, as a result of the diffraction grating of the foil layer of the card or a foil etched portion of the card, if the trading card is a card containing foil. Because the point light source is directed to a small area of the card and the image is taken in an otherwise dark environment, the rest of the image of the card will be dark relative to the bright areas representing light reflected by the foil of the card. Whereas, an image taken of a non-foil card under the same lighting conditions will not include the bright areas in the image. The method further includes processing the image file to convert the image file to a hue, saturation value ("HSV") colour space, whereby the HSV colour space can be used to isolate the value data for each pixel, and the value data for each pixel can then be further processed to detect whether a principal maxima is present or absent in the image file of the trading card. The algorithms thus employed will either identify the trading card as a card containing foil, or not a foil card.

In another aspect of the present disclosure, trading card sets often include an identical portion or image across all of the trading cards within the set, such as a single, solid-colour border around the back face of the trading card. For such trading card sets, sharing an identical portion or feature, a method of assigning a condition grading to each card in the set utilizes the image data obtained from an image file of the front and/or back surface of each card that displays the identical portion or feature common to all cards across the set. The portion of the image file that includes only the border, or a portion thereof, which is of uniform colour and appearance across all similar trading cards, is isolated for further analysis to determine what percentage of that border portion of the card is different from the uniform colour, which determination gives an approximation of the amount of damage or wear of the card. The calculation of the number of pixels in the image file, in the border portion of the trading card that are different, may be determined from an image file that has been converted to an HSV colour space, and evaluating the amount of pixels having a value integer that is less than a predetermined threshold. Thus, this method provides for objectively determining the condition grading of the trading card, without having to reference a Golden Image file.

Advantageously, the condition grading method described herein may be employed without having to obtain an image of the entire surface of the trading card. For example, advantageously, rollers may be utilized to flatten the card against a platform when the image is taken, but because the methods employed herein do not require processing image data of the entire back surface of the card, images in which a portion of the card is obscured, for example by rollers, can still be processed by this method so as to assign a rough grading condition to the card. In some aspects of the present disclosure, a large batch of cards may then be sorted into different categories; for example, cards may be sorted based on whether they have been assigned a near-mint condition grading, a slightly played condition grading, or a heavily played condition grading. After having sorted a large batch of cards into the rough grading categories, the most highly valued near-mint condition cards may be further rated by a human to assign a final valuation to them, without having to manually review the entire batch of cards. In other aspects of the present disclosure, a seller of used trading cards may assign a uniform pricing to each condition category, without having to spend any time further manually reviewing the cards.

In another aspect of the present disclosure, an apparatus is provided, the apparatus comprising an imaging chamber, a platform positioned within the imaging chamber and adapted to support an illuminated card, at least one diffuse light source positioned within the imaging chamber to illuminate the card, and a camera for taking an image of the illuminated card so as to generate the image file. Advantageously, in some embodiments the apparatus may further include a conveyancing system and a card hopper, the conveyancing system adapted to convey a plurality of cards, one card at a time, from the card hopper to the platform. The conveyancing system may further be adapted to convey the plurality of cards, one card at a time, from the platform to a sorting deck, wherein the plurality of cards may be sorted at the sorting deck according to at least one characteristic of each card, the characteristic identified by an analysis of the image file of each card. In this manner, a large batch of cards may be loaded into the card hopper, and then the conveyancing system may automatically convey each card, one at a time, from the card hopper to the platform, where the image file is generated, and then the card may then be conveyed to a sorting deck where the card is then sorted into a respective category.

An apparatus for performing either or both of the methods for identifying a foil card and/or assigning a condition grading to a card includes an imaging chamber, the imaging chamber adapted to substantially exclude any light from an external light source from entering the imaging chamber; a platform positioned within the imaging chamber and adapted to support the illuminated card; a diffuse light source, the diffuse light source positioned within the imaging chamber to illuminate the illuminated card; and an image capture device for taking an image of the illuminated card so as to generate the image file.

In some embodiments of the present disclosure, a method for identifying a card containing foil comprises the steps of: obtaining a first image file depicting a card, wherein the card is illuminated by a point light source and the card is positioned outside a field of view of the point light source; converting the image file into a hue, saturation, value ("HSV") colour space; applying a value mask to the converted image file so as to exclude a first group of pixels from analysis, each pixel of the first group of pixels having an integer less than a predetermined foil threshold value, said foil threshold value selected to identify said first group of pixels that does not form an intensified brightness area of the image file; determining a number of remaining pixels and comparing the number of remaining pixels against a predetermined first threshold number of remaining pixels, wherein if the number of remaining pixels exceeds the first threshold number of remaining pixels the card is identified as a card containing foil.

In another aspect of the present disclosure, the point light source used to illuminate the card under analysis includes a single point light source and an array of point light sources, each of the point light sources spaced apart from one another within the said array, and wherein the said array is reflected across substantially an entire surface area of the card. The step of obtaining the first image file depicting the card includes obtaining the first image file wherein the card is illuminated by the single point light source and obtaining a second image file depicting the card wherein the card is illuminated by the array of point light sources. The steps of the foil detection method, described above, are performed on each of the first and second image files. If the first image file includes the intensified brightness area that is a principal maxima, the card is identified as a foil card, and if the second image file includes the intensified brightness area that is one or more bright direct reflections, the card is identified as a foil etched card.

In another aspect of the present disclosure, the foil detection method step of determining a number of remaining pixels and comparing the number of remaining pixels against the predetermined first threshold includes comparing the number of remaining pixels against a predetermined second threshold, wherein the first threshold is greater than the second threshold, and wherein, if the number of remaining pixels of the first image file exceeds the first threshold number of remaining pixels the card is identified as a foil card, and wherein, if the number of remaining pixels of the second image file is less than the first threshold but exceeds the second threshold, then the card is identified as a foil etched card.

In another aspect of the present disclosure, an apparatus for performing the foil detection method comprises an imaging chamber, the imaging chamber substantially excluding any light from an external light source from entering the imaging chamber; a platform positioned within the imaging chamber for supporting the card; the point light source positioned within the imaging chamber such that the platform is positioned outside the field of view of the point light source; and an image capture device for capturing an image of the card so as to generate the first image file. In some embodiments, the light source includes a single point light source and an array of point light sources, each of the point light sources spaced apart from one another within the said array, and wherein the said array of point light sources is reflected across substantially an entire surface area of the card. In some embodiments, the light source may be a single point light source, and one of the single point light source or the card may be mounted to a mobile scanning stage, the mobile scanning stage actuated by an actuator so as to translate the single point light source or the card relative to one another so as to translate a reflection of the point light source across substantially an entire surface area of the card. The first image file generated by the image capture device comprises a plurality of first image files, each first image file of the plurality of first image files depicting the card illuminated by the point light source at a plurality of different positions on the surface area of the card, and the intensified brightness area is selected from a group comprising: a bright direct reflection identifying that the card is an etched foil card, a principal maxima expression or reflection identifying that the card is a foil card.

In another aspect of the present disclosure, a method for assigning a condition grading to a card comprises the steps of: obtaining an image file depicting a diffusely illuminated card, the image file depicting at least a portion of an extent of the card; converting the image file into a hue, saturation, value ("HSV") colour space; eliminating a nonuniform portion of the converted image file from analysis so as to isolate a uniform portion of the converted image file; applying a value mask to the converted image file so as to exclude a first group of pixels of the uniform portion of the image file from analysis, each pixel of the first group of pixels having an integer less than a predetermined threshold. The threshold is selected to identify said first group of pixels representing an undamaged card portion. A number of remaining pixels is then determined and compared against a plurality of grading thresholds so as to assign a condition grading of the card.

A method for identifying characteristics of a trading card comprises the steps of: obtaining a first image file depicting a card, wherein the card is illuminated by a point light source and the card is positioned outside a field of view of the point light source; converting the first image file into a hue, saturation, value ("HSV") colour space; applying a first value mask to the converted first image file so as to exclude a first group of pixels from analysis, each pixel of the first group of pixels having an integer less than a predetermined foil threshold value, said foil threshold value selected to identify said first group of pixels that does not form an intensified brightness area of the first image file; determining a first number of remaining pixels and comparing the first number of remaining pixels against a predetermined foil threshold number of remaining pixels, wherein if the first number of remaining pixels exceeds the threshold number of remaining pixels the card is identified as a card containing foil; obtaining a second image file, the second image file depicting at least a portion of an extent of the card; converting the second image file into a hue, saturation, value ("HSV") colour space; eliminating a nonuniform portion of the converted image file from analysis so as to isolate a uniform portion of the converted image file; applying a second value mask to the isolated uniform portion of the converted image file so as to exclude a second group of pixels of the uniform portion of the image file from analysis, each pixel of the second group of pixels having an integer less than a predetermined condition threshold, wherein the condition threshold is selected to identify said second group of pixels representing an undamaged card portion; and determining a second number of remaining pixels and comparing the second number of remaining pixels against a plurality of grading thresholds so as to assign a condition grading of the card.

BRIEF DESCRIPTION OF THE FIGURES

FIGS. 5A and 5B are examples of an original image file, with its colours inverted for clarity, and a converted image file depicting a foil card, respectively, wherein the original image file shows rainbow-coloured principal maxima and the converted file image displays pixels having a high value integer depicted in black;

FIGS. 5C and 5D are examples of an original image file, with its colours inverted for clarity, and a converted image file depicting a non-foil card, respectively, wherein the converted file image displays pixels having a high value integer depicted in black;

FIGS. 6D-6F are images in which the colours of the images shown in FIGS. 6A-6C, respectively, have been inverted for clarity;

FIGS. 6J-6L are images in which the colours of the images shown in FIGS. 6G-6I, respectively, have been inverted for clarity;

FIG. 6M is an example of and original image file of a cared with the full extent being partially obscured from view;

FIG. 6N is the card image file of FIG. 6M, with masking applied so as to reveal only a portion of the extent of the card;

FIG. 6O is the card image file of 6M, with masking applied so as to conceal the objects obscuring the view of the extent of the card depicted in FIG. 6M;

FIG. 11A is an example of an original image file, with its colours inverted for clarity, depicting a foil etched card, wherein the foil etched portions of the card are not visible in the image file; and FIG. 11B is an example of an original image file, with its colours inverted for clarity, depicting a non-foil etched version of the card depicted in FIG. 11A, wherein the foil etched portions of the card are visible in the image file.

DETAILED DESCRIPTION

Foil Detection Method

In one aspect of the present disclosure, a method for automatically identifying a card containing foil, as distinguished from a non-foil card, is provided. As described above, in the trading card business, some trading cards are provided with a foil layer overlaid by a graphics layer of the card, thereby producing a holographic effect to the appearance of the card under various lighting conditions. The foil layer consists of a diffraction grating, so that light shining on the card will produce an interference pattern including principal maxima. Such cards are referred to herein as "foil cards".

Figure 4A:
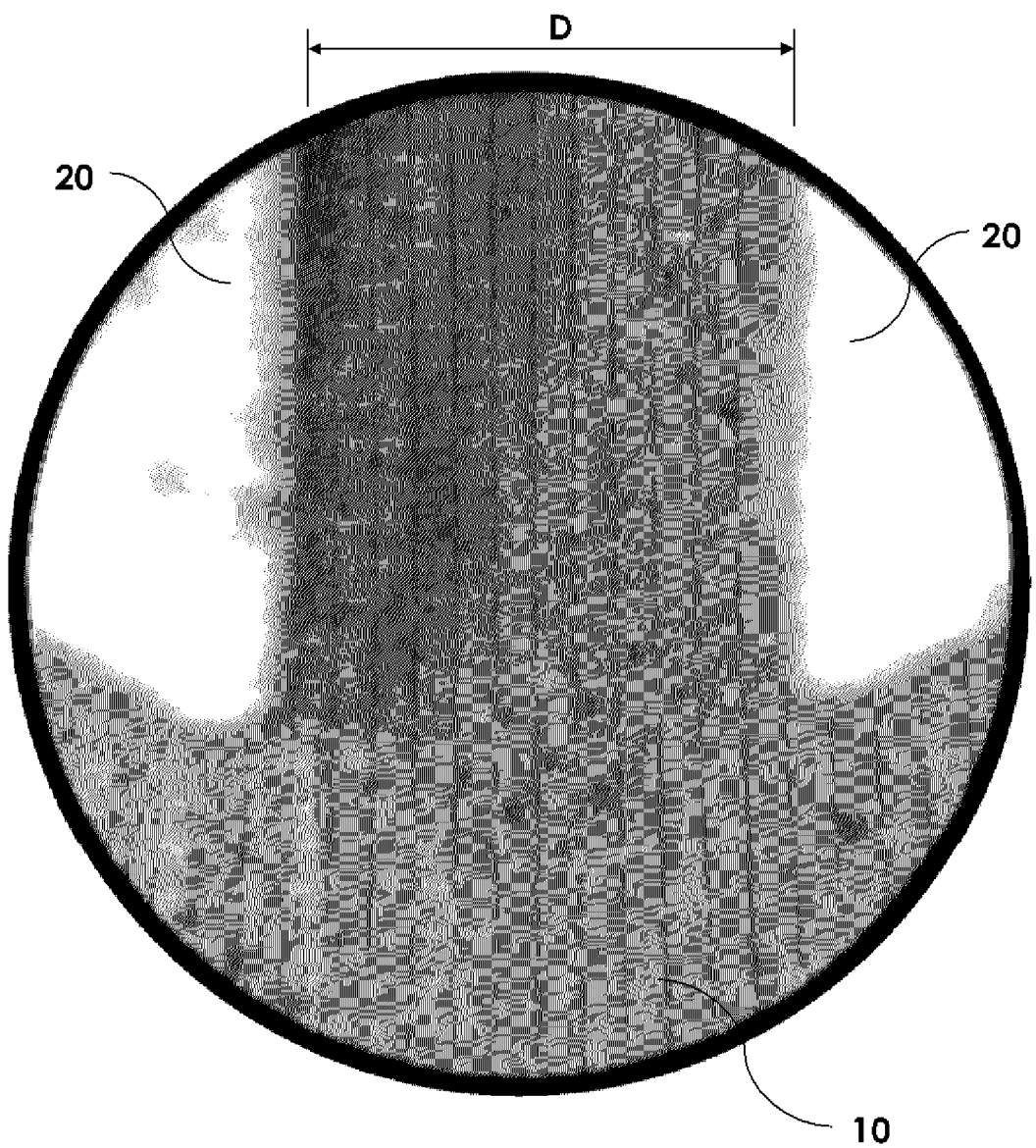
FIG. 4A is a 100× magnified photograph of a foil layer of a foil trading card.
Figure 4C:
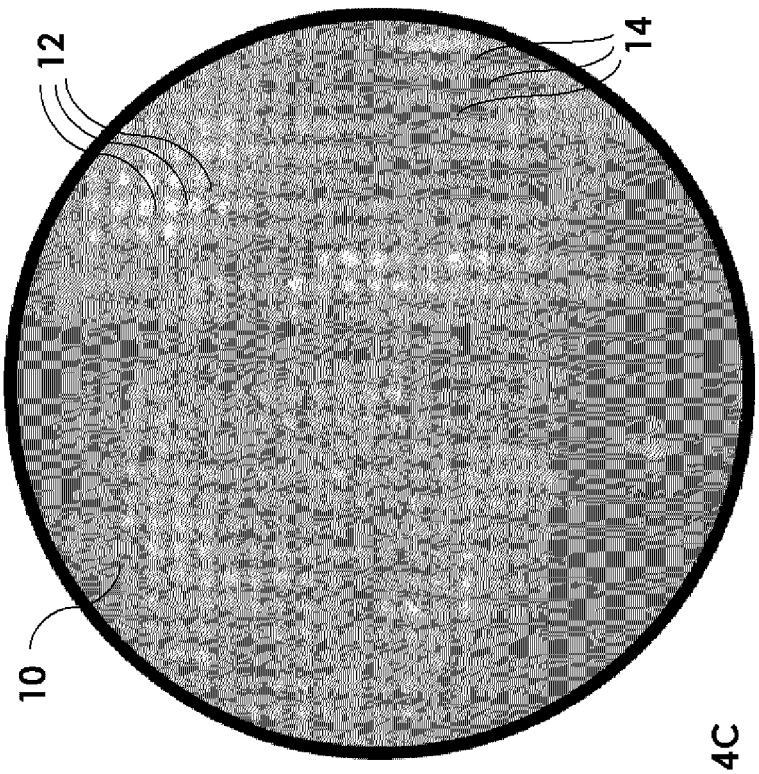
FIG. 4C is a close-up view of a portion of the foil layer shown in FIG. 4B, in which diffraction grating lines of the foil layer are visible.
Figure 4B:
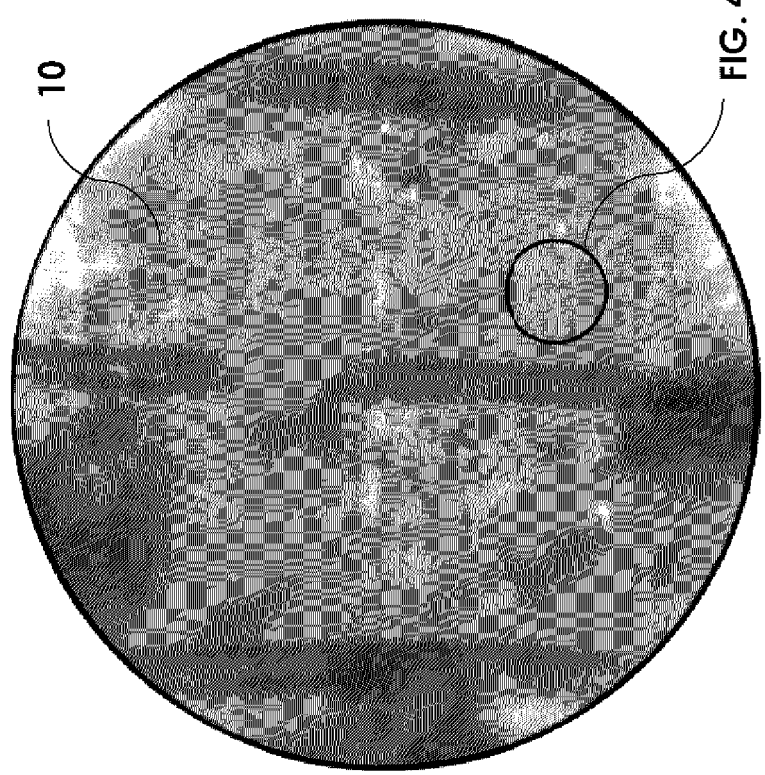
FIG. 4B is a 1000× magnified photograph of the foil layer shown in FIG. 4A.

FIG. 4A is a magnified image of a foil layer 10 of a foil card, taken at 100× magnification. In the image displayed in FIG. 4A, a pair of calipers 20, 20 are calibrated at a 1 mm distance D apart from each other. FIG. 4B is a further magnified image of the foil layer depicted in FIG. 4A, taken at 1000× magnification. FIG. 4C is a close up of a portion of the magnified image of FIG. 4B, in which a plurality of horizontal grooves 12 and vertical grooves 14 of the foil layer are visible. Thus, the pattern of horizontal and vertical grooves 12, 14 of the foil layer 10 create a diffraction grating. When a foil card is exposed to a light source, the diffraction grating of the foil layer 10 will produce a diffraction pattern including constructive interference patterns presenting as principal maxima, which may be perceived as a rainbow pattern across the surface of the card when the light source is composed of white light.

Other types of cards containing foil include "foil etched cards", which are manufactured by adhering a thin layer of foil to a portion of the card's surface. A varnish may be applied to the entire surface of the card after the foil etching is adhered to the card's surface. Unlike a foil card, which typically includes a foil layer covering the entire surface area of the card, a foil etched card may include foil etching that covers only small portions of the card's surface. For example, foil etching may typically be used to highlight features in the artwork of the card. When light reflects from the foil etching on the card, the reflections may give the foil etched portions a sparkling appearance.

In contrast, when a trading card that does not have a foil layer or any foil etching, otherwise referred to herein as a "non-foil card", is exposed to a light source, no interference pattern or bright light reflections will be detected across the surface of the card, because the non-foil card does not have the foil layer including a diffraction grating nor any pieces of foil adhered to the card's surface. However, under most lighting conditions, the glossy surface of the card will also reflect some light, although such light reflections are not perceived to be as bright as the reflections produced by foil cards or foil etched cards.

Advantageously, the applicant has discovered that taking images of trading cards that are illuminated by a point light source in an otherwise darkened environment, wherein the surface of the card is positioned outside the field of view of the point light source, produces an image of the card in which the bright principal maxima of a foil card, or the bright direct reflections produced by the foil-etched portions of a foil etched card, will be clearly visible, generally unobscured by reflections of the light source, save for a small reflection of the point light source limited to a small area of the card's surface. Whereas, images taken of a non-foil card, under the same lighting conditions, may produce an image in which only a small bright spot representing a direct reflection of the point light source is visible against an otherwise darkened card surface. Such images are captured substantially in the absence of other light sources, such that the principal maxima or bright direct reflections of cards containing foil will be clearly distinguishable in the resulting image of the trading card, as compared to the images taken of non-foil cards. The applicant has also found that a method of processing the image file of the trading card, so as to separate the pixels that are part of the principal maxima or bright direct reflections from the pixels that do not form a part of the principal maxima or bright direct reflections, enables a method for automatically detecting whether a trading card is a card containing foil, or a non-foil card. In another aspect of the present disclosure, the methods described herein may be used to further distinguish a foil card from a foil etched card.

Figure 2A:
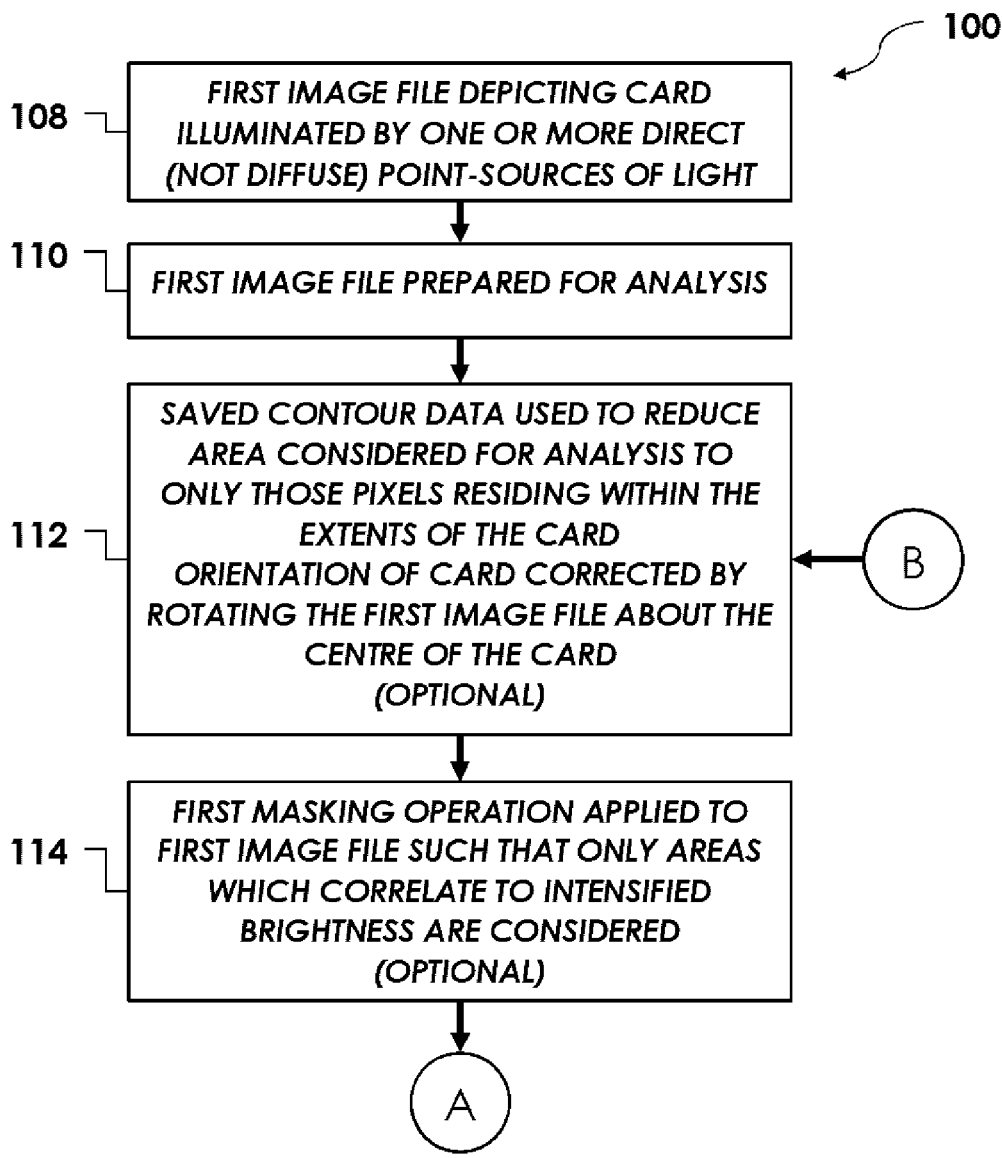
FIGS. 2A, 2B and 2C are a logic flow diagram depicting an embodiment of the method for identifying cards containing foil, in accordance with the present disclosure.
Figure 2B:
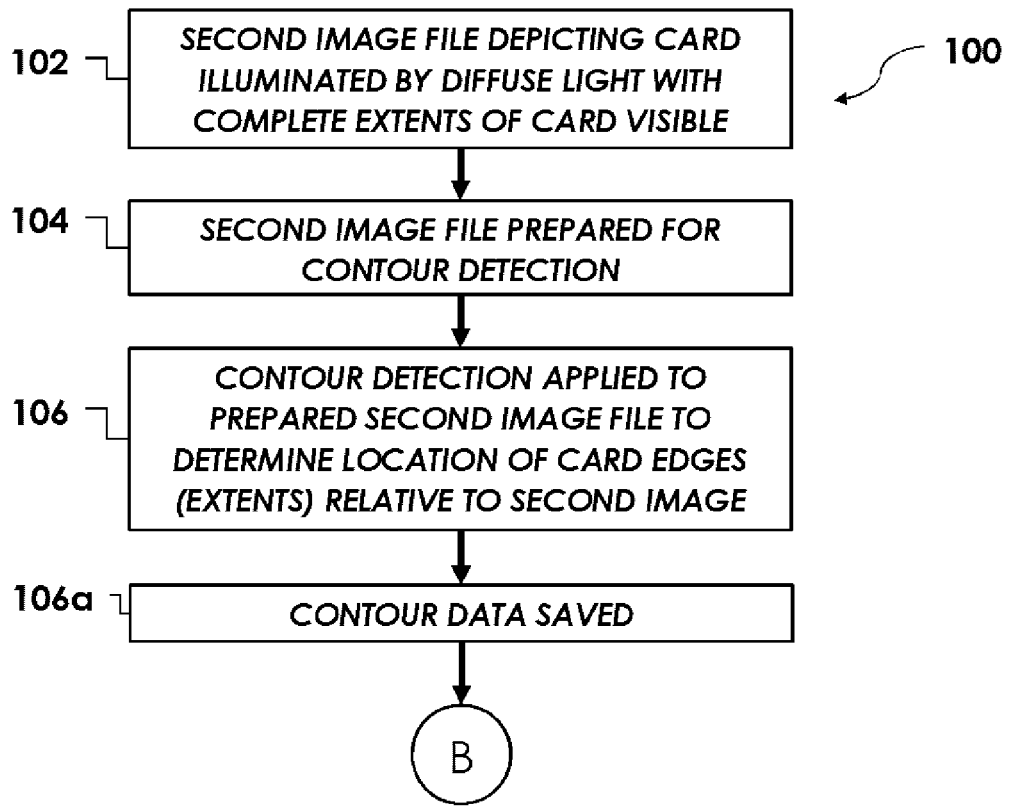
Figure 9:
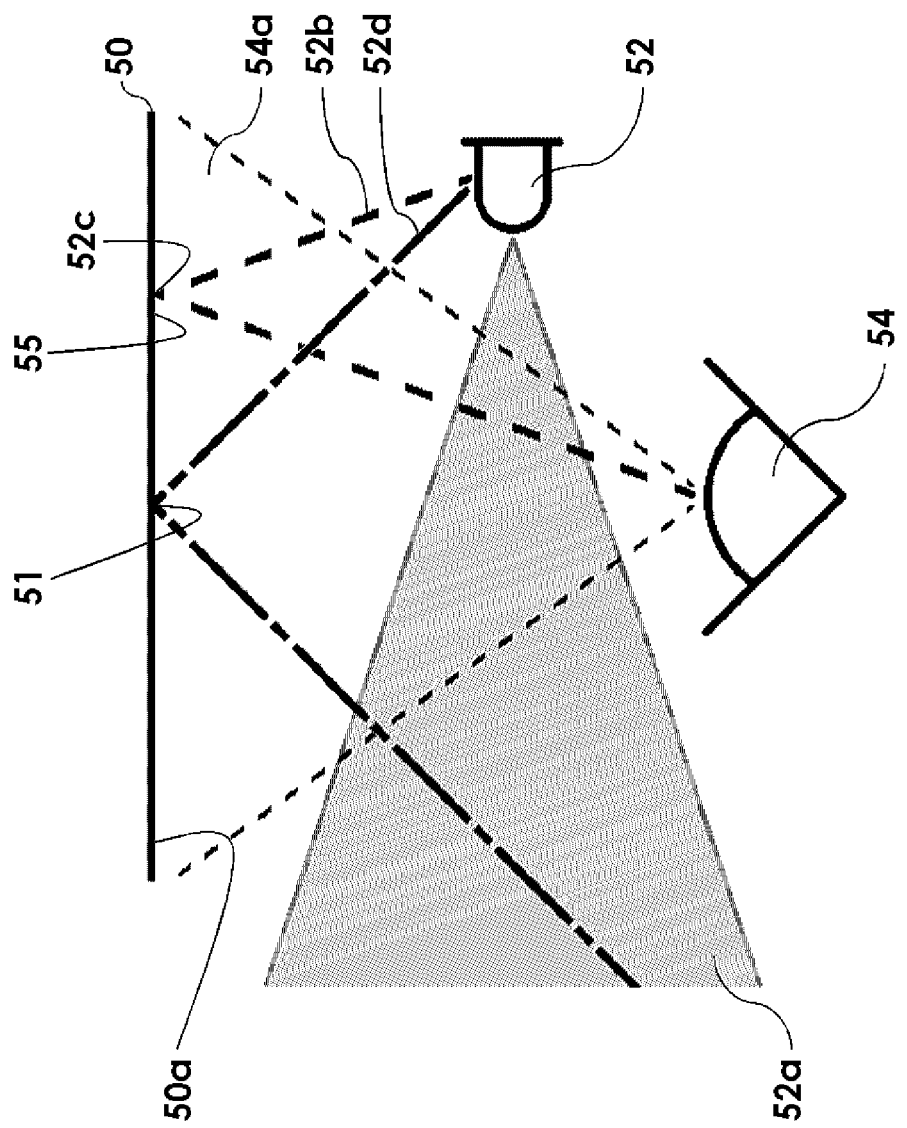
FIG. 9 is a schematic drawing, showing the lighting conditions for acquiring an image of a trading card in some embodiments of the present disclosure.

With reference to FIGS. 2A, 2B and 9, in an embodiment of the method 100 to detect a foil card, a first image of the card under analysis is ideally acquired in an environment where the card is illuminated by a point source of light, to the exclusion of other light sources. As will be appreciated by a person skilled in the art, point light sources may include: lasers (including but not limited to laser lamps), incandescent lamps (including but not limited to gas lamps and carbon arc lamps), monochromatic light sources, gas discharge lamps (including but not limited to fluorescent lamps, metal halide lamps, and plasma lamps), LEDs (including but not limited to LED lamps), and other light sources known to a person skilled in the art. In a preferred embodiment, the surface of the card is positioned so as to be outside the field of view of the point light source, such as shown in FIG. 9, wherein a point light source 52, such as an LED light, has a field of view 52a, represented by the shaded grey area. The field of view 52a represents the area of light cast by the point light source 52 that is within a given range of brightness, measured in lumens. A surface 50a of card 50 is positioned so as to be outside the field of view 52a of the point light source 52. A reflection 52c of the point light source 52 may be visible on the surface of the card 50a, such reflection 52c caused by a ray of light 52b cast from the point light source 52.

While the reflection 52c will typically appear as a bright spot on all cards, including foil cards, foil etched cards and non-foil cards, principal maxima will only be visible as bright spots on the card's surface if the card is a foil card. Images of the card may be captured by an image capture device, such as a camera 54 having a field of view 54a. Advantageously, when images are taken in the lighting conditions described above and shown in FIG. 9, the rest of the surface of the card will appear dark, relative to the bright spots of the principal maxima and the light source reflection 52c. With respect to foil etched cards, images taken of foil etched cards under the same lighting conditions may produce small areas of bright direct reflections when the light source reflection 52c is proximate a foil etched portion of the card, which bright direct reflections may be distinguished from the light source reflection 52c and a principal maxima that is produced by a foil card. As further explained below, it is this feature of the resulting image files that enable the methods described herein to distinguish foil cards and foil etched cards from non-foil cards, in embodiments of the present disclosure.

A white LED light source will produce a rainbow coloured principal maxima in a foil card, due to the interference pattern created by the different light wavelengths that comprise the white light source when the light source is reflected by the diffraction grating provided by the foil layer of a foil card. However, it will be appreciated by a person skilled in the art that principal maxima may also be created by a point source of light that is monochromatic or which is not a white light source, although such resulting diffraction patterns of principal maxima will not present in rainbow colour, but rather will present as the same colour as that of the point light source, appearing as a brightened interference pattern across a portion of the trading card's surface.

It will be appreciated that the methods described herein may be performed on such images that are obtained separately from the computer system that is performing the foil detection method. For example, a database of trading card images, taken under the lighting conditions described above, may be obtained from an external source and then processed by a computer system executing software that performs the foil detection method. In other embodiments, as will be further described below, a card sorting apparatus may be provided which takes the images of the trading cards to be analyzed, and also includes an integrated computer system executing the software that performs the foil detection method.

Figure 2C:
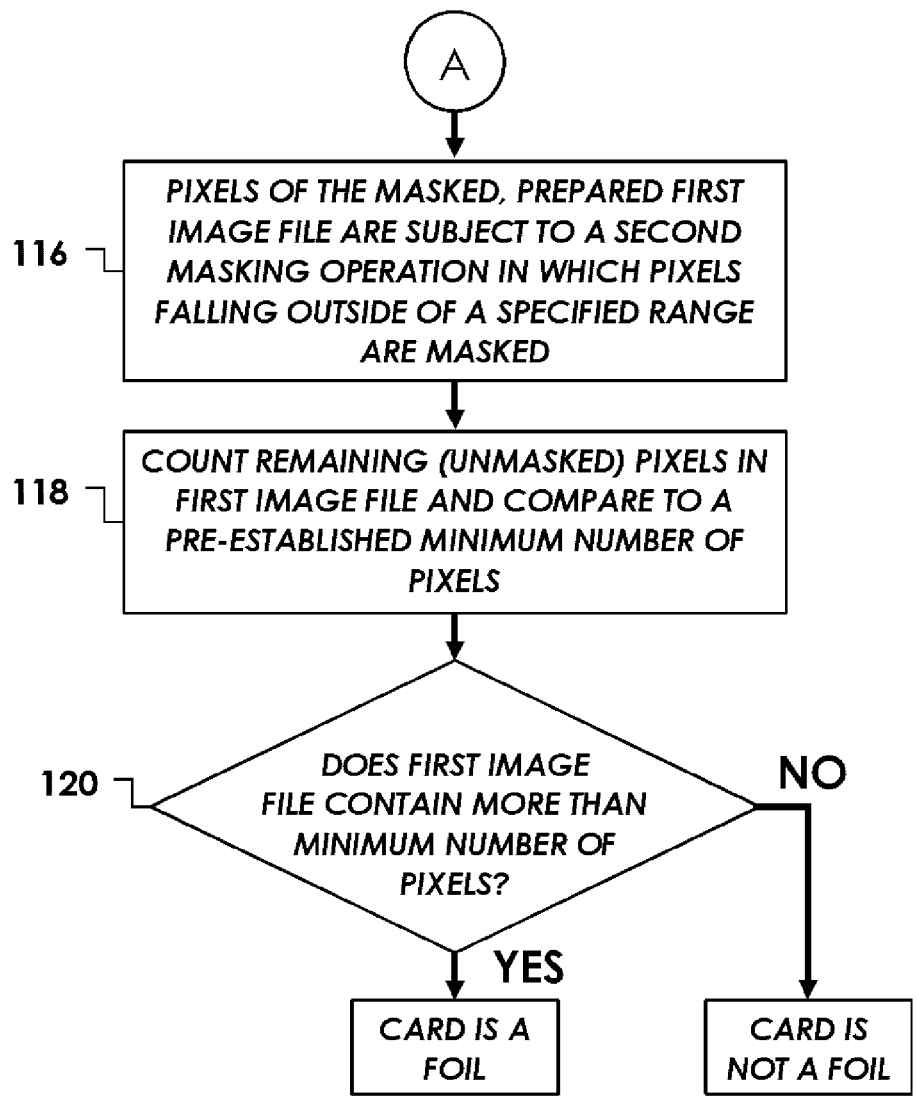

In one aspect of the present disclosure, referring to FIGS. 2A, 2B and 2C, at step 108 a first image file depicting a card illuminated by a point light source is obtained. The original image may either be converted into a digital image file, or otherwise the image may already be a digital image file, such as where the image acquisition device is a digital camera. The first image file is then prepared for analysis by converting the image file into an HSV colour space, at step 110, whereby each pixel is assigned three integers representing the pixel's Hue, Saturation, and Value.

The steps 102, 104, 106, 106a, 112 and 114 illustrated in FIGS. 2A and 2B are optional steps that are not necessary for performing the foil detection method described herein. Therefore, in some embodiments of the foil detection method, the method may proceed from step 108 to step 110 and then to step 116, wherein the converted image file is masked by applying a value mask so as to exclude any pixels that have a Value integer less than a predetermined foil threshold. An example of images of a foil card is shown in FIGS. 5A and 5B, and of a non-foil card is shown in FIGS. 5C and 5D. As can be seen in the foil card image of FIG. 5A, a reflection 52c of the point light source 52 appears as a bright spot, and principal maxima 56 appear as other bright portions of the image. As can be seen in FIG. 5C, which is an image of a non-foil card taken under the same lighting conditions, only the point source light reflection 52c and some scattered random bright areas of the card 58 are visible in the image. It will be appreciated that the bright spots or portions appear as dark spots in the inverted images presented in FIGS. 5A to 5D, which images are presented as inverted images herein for clarity.

A predetermined foil threshold may be selected so as to identify pixels that do not form areas of intensified brightness in the converted first image file, which areas of intensified brightness may include, for example, principal maxima produced by a foil card or bright direct reflections produced by a foil etched card. For example, in the HSV colour space, the Value of each pixel indicates the relative brightness of that pixel. In the lighting conditions under which the image of the trading card is taken, because the card was illuminated by a point light source, the only pixels in the image which will have a high integer for the pixel's Value, representing the brightness of the pixel, will be those pixels which form a portion of the principal maxima, a bright direct reflection, or, possibly, a portion of the reflection of the point light source, because the rest of the image will be relatively dark under the described lighting conditions. Examples of converted images, depicting a foil card and a non-foil card, are shown in FIGS. 5B and 5D respectively. In the examples of converted images shown in FIGS. 5B and 5D, only the pixels having a Value integer that exceeds the Value threshold $V_{\_foil}$; (or in other words, pixels having a value integer that falls within the range of $V_{foil}$ to $V_{\_max}$, with $V_{\_max}$ representing the maximum possible value integer) are shown in black, with the rest of the pixels excluded in the masking operation performed at step 116.

FIGS. 5B and 5D also depict converted images in which the bright spot depicting the point source reflection 52c, which bright spot is not relevant to the detection of a principal maxima because it will appear in all images, has been masked from the converted images in FIGS. 5B and 5D so as to exclude them from further analysis in the present method, such an optional step occurring, for example, in step 114 of method 100. As may be seen in a comparison of FIG. 5B, depicting a foil card, as compared to FIG. 5D, depicting a non-foil card, the black areas representing pixels that exceed the Value threshold $V_{\_foil}$ are much greater in the foil card image of FIG. 5B as compared to the non-foil card image of FIG. 5D. Therefore, the masking operation performed at step 116 may, in some embodiments, mask pixels based only on the Value integers of the pixels, while ignoring the Hue and Saturation integers for those pixels. However, it will be appreciated by a person skilled in the art that the second masking operation, performed at step 116, may optionally involve masking pixels based on selected ranges of Hue and/or Saturation integers of the pixels, and that such methods are intended to be included in the present disclosure.

By counting the remaining pixels at step 118, which have been identified in one embodiment as bright pixels based on the high integer Value of each one of those pixels, one may distinguish between cards containing foil and non-foil cards. At step 120, the number of bright pixels counted at step 118 is compared against a predetermined threshold number of high integer Value pixels, such predetermined threshold number selected to indicate that the image file contains a principal maxima and/or a bright direct reflection. Alternatively, rather than calculating an absolute number of remaining pixels, this calculation may also be done to determine the percentage of remaining pixels, as compared to the overall number of pixels in the area under consideration in the image file.

In some embodiments, step 120 may include comparing the number of remaining pixels, as determined at step 118, against a first threshold and a second threshold number of high integer Value pixels, wherein the first threshold is greater than the second threshold. If the number of remaining pixels is equal to or greater than the first threshold, then the card is identified as a foil card, whereas if the number of remaining pixels is less than the first threshold but greater than the second threshold, then the card is identified as a foil etched card. The first and second thresholds are determined by recognizing that the areas of intensified brightness, displayed in the converted image file, may typically be larger for a foil card as compared to a foil etched card, because the areas of intensified brightness produced by principal maxima in the converted image of a foil card exceed the areas of intensified brightness produced by bright direct reflections produced by the small areas of foil etching on the surface of a foil etched card.

Figure 8A:
FIGS. 8A and 8B are images of the front and back surfaces respectively of an example of a Magic: The Gathering™ trading card.
Figure 8B:
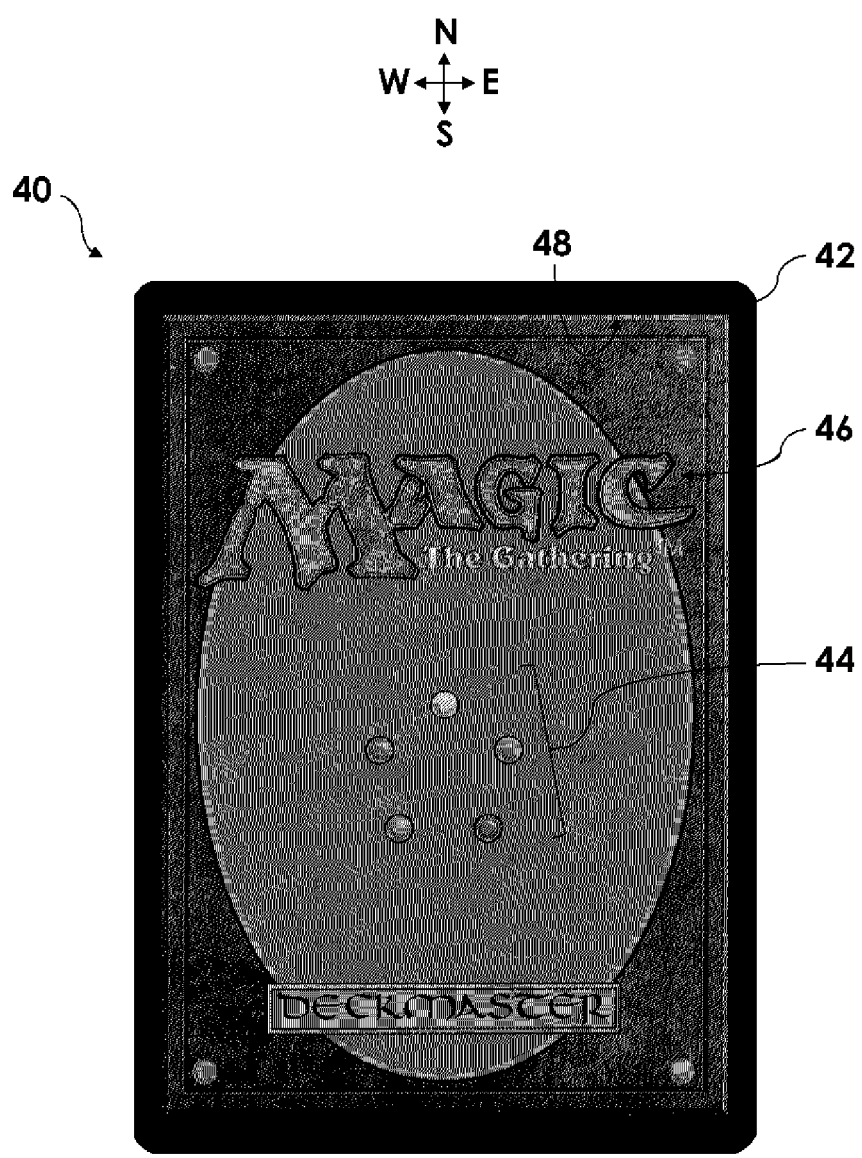

In some embodiments, such as shown in FIGS. 2A and 2B, the method may optionally include obtaining a second image file of the card, at step 102, whereby the card in the second image file is illuminated by a diffuse light source. The diffuse light source will produce an image of the trading card in which the entire surface of the trading card is substantially evenly lit by the diffuse light source. The second image file is prepared for contour detection, at optional step 104, and then a contour detection algorithm, as would be known to a person skilled in the art, may then be applied to the second image of the trading card at step 106, so as to identify the extents and boundaries of the illuminated card in the second image file to thereby generate a contour data set. As used herein, the term "extent" refers to the edges of the physical trading card, and the term "boundary" refers to other straight line features of a trading card's image, including for example the boundary 48 depicted in an image of the rear face of a Magic: the Gathering™ card shown in FIG. 8B.

The contour data set is saved, at step 106a, and then the contour data set may then be applied to the first image file, at optional step 112, to exclude a second group of pixels from the image file, whereby the second group of pixels comprises those pixels located outside the extents of the illuminated card depicted in the image file. The step 112 may therefore increase the reliability of the foil detection method, because utilizing the contour detection algorithms enables the elimination of the surrounding background from the image, such that the analysis performed on the image is only performed on those portions of the image that are a part of the trading card itself, and not the portions of the image depicting the surrounding environment, such as the surface on which the trading card was supported when the image was taken. An example of a contour detection algorithm, not intending to be limiting, includes the Open CV find contours method, as would be known to a person skilled in the art.

In some embodiments, the step 110 of preparing the first image file for analysis may optionally also include correcting a spherical distortion of the image file, such spherical distortion being caused by the curvature of the lens through which the image was captured. Correcting the spherical distortion of the image file may increase the accuracy of the foil card detection method, because the image file, once corrected for spherical distortion, is a more accurate representation of the percentage of the card surface which contains bright spots as opposed to dark spots, thereby increasing the accuracy of the method by measuring the percentage of the card surface occupied by the principal maxima in an image of a foil card. Advantageously, the second image of the card taken under a diffuse light source may also be used for other identification and card sorting methods, such as automated detection of the identity of the card by comparing the second image to a database of trading card images.

A further application of applying the contour data set to the image file is to optionally identify and correct an orientation of the illuminated card depicted in the image file, for example by rotating the image file so as to reorient the card to a selected orientation, at step 112. In other applications, detecting the orientation of the card may be useful so as to sort a plurality of cards by their orientation. As will be explained further below, an example of why it would be useful to have cards sorted by their orientation includes when you have a large batch of cards which are mixed in any number of orientations, and a particular sorting method depends on taking images of a set of cards wherein every card is in the same orientation. For trading cards, there are four possible orientations: the north and south orientations of the front surface of the card; and similarly, the north and south orientations of the rear surface of the card, as indicated for example in FIGS. 8A and 8B, which shows the front and rear surfaces of the cards in the north orientation, respectively.

Applying the contour data to the second image file may advantageously be used to sort the cards into different orientations, for example by utilizing knowledge of a trading card's layout which is common between all trading cards within a trading card set. For an example, not intending to be limiting, Magic: The Gathering™ trading cards all have a similar layout, whereby the front surface 30 of the card includes a title box 32 at the top, an art box 34 underneath the title box, a type line box 36 immediately underneath the art box, and a text box 38 beneath the type line box, as shown for example in FIG. 8A. Automated detection software may thereby parse out the elements of the layout of a Magic: The Gathering™ card's front surface, and use that information to identify and sort the orientation of the card by detecting, for an example, the position of the art box relative to the type line box, both of which have a dimension and positioning that is substantially constant between all Magic: The Gathering™ cards. As a further example, the back surface of a Magic: The Gathering™ card is substantially identical across all such cards. The back surface 40 of a Magic: The Gathering™ card includes a black border 42, and then an interior image with five coloured spheres 44 beneath the word "Magic" 46 in a stylized font. Similarly, an analysis of an image of the back of a Magic: The Gathering™ card is easily differentiated from the front surface of the Magic: The Gathering™ card due to their different layouts, and furthermore, the orientation of the back surface of the magic card is detectable by, for example, detecting the relative orientation of the five coloured spheres 44 relative to the word "Magic" 46. It will be appreciated by a person skilled in the art that any number of characteristics that are identical across a set of trading cards may be utilized in order to detect and/or correct for the orientation of a trading card depicted in a given image.

A secondary means by which the contour data may be beneficially employed to sort cards by their orientation involves consideration of only the contour(s) which define the outer bounds (extent) of the card. Having defined the extent of the card, all pixels outside the card's extent may be discounted from analysis, and the isolated card image may then be compared against a database of trading card images of known orientation. For example, if the database of trading card images contains images in a north orientation, the card image may then be compared against each of these database images. If a high-fidelity match results from this comparison, the card image is highly likely to be in the north orientation. If no high-fidelity match results, the card image may be rotated 180° and a second comparison may be run against the database of trading card images. If the second comparison yields a high-fidelity match, the card image is highly likely to be in the south orientation. The same process may be repeated comparing the card image against a single image of the back of a trading card in a known orientation.

Using this method, the card's orientation may thus be determined by comparing its image (of either the front or rear faces of the card) against a database of card images in a known orientation.

Figure 10A:
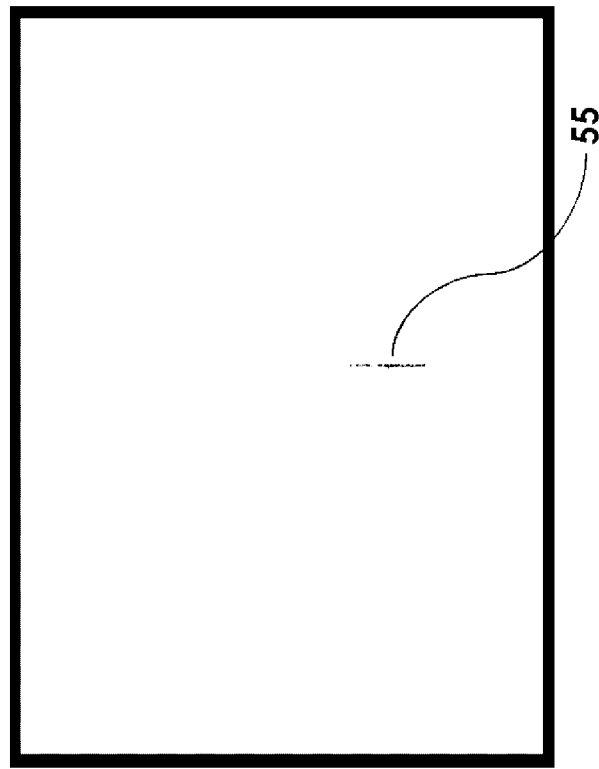
FIGS. 10A and 10B are examples of an original image file, with its colours inverted for clarity, and a converted image file depicting a foil etched card, respectively, wherein the original image file shows a card illuminated by a point light source and shows an example of a bright direct reflection of the foil etched portion of the card, and the converted file image displays pixels having a high value integer depicted in black.
Figure 10B:
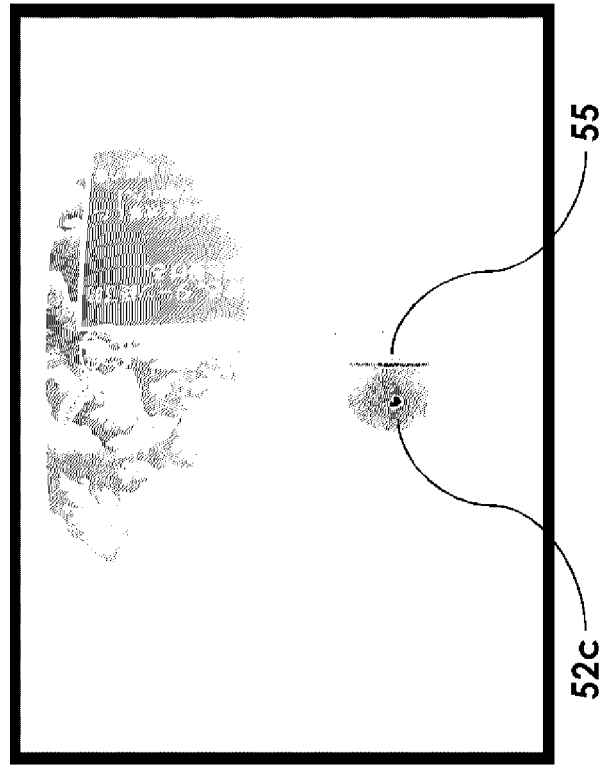
Figure 10D:
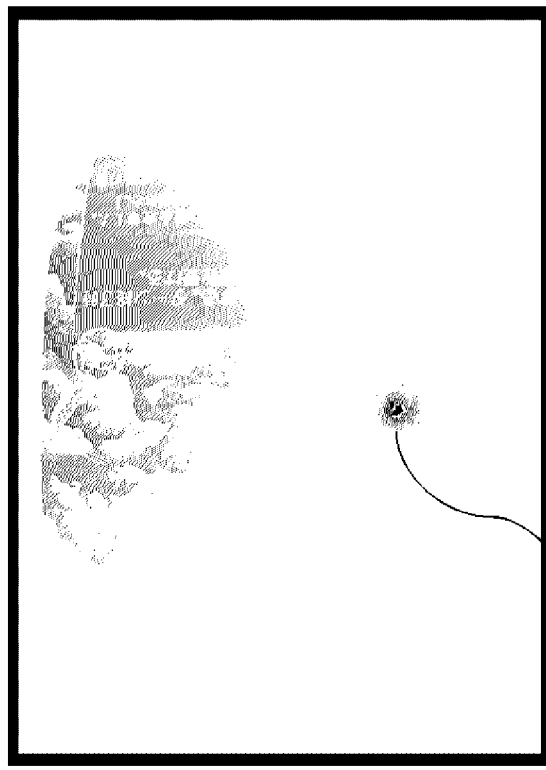
FIGS. 10C and 10D are examples of an original image file, with its colours inverted for clarity, and a converted image file depicting a non-foil card, respectively, wherein the converted file image displays pixels having a high value integer depicted in black.
Figure 10C:
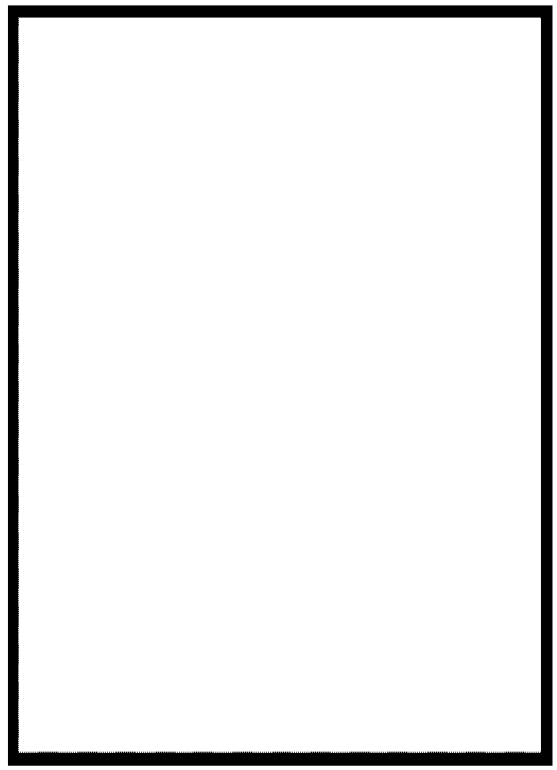

With respect to detection of foil etched cards, there are at least two possible methods for automatically detecting foil etched cards based on the analysis of image files depicting foil etched cards taken under certain lighting conditions. As previously described, foil etched cards typically include small pieces of foil adhered to small portions of the card's surface. With reference to FIGS. 9, 10A and 10B, if rays of light from a single point light source are reflected from the surface 50a of a card at a location proximate a foil etched portion 51 of the card's surface, the light ray will be directly reflected into the field of view 54a of the camera 54. The resulting image will show this direct reflection 55 as a bright spot, as seen in FIGS. 10A and 10B. For comparison, a non-foil version of the card, depicted in the images of FIGS. 10C and 10D, shows that the only bright spot is the reflection 52c of the single point light source 52.

Thus, as described above, foil etched cards may be identified from images taken under the lighting conditions described above, wherein the card is positioned outside the field of view of the point light source 52. However, it should be appreciated that the resulting image of a foil etched card will only produce a direct reflection appearing as a bright spot if the reflection 52c of the point light source is located proximate the foil etched portions of the card. Therefore, in some embodiments of the present disclosure, it is preferable to move the point light source relative to the card so that the reflection 52c is reflected from different parts of the card under analysis, so as to increase the probability that the point light source reflection 52c will be proximate a foil etched portion of a foil etched card. In some embodiments, the method may include taking a first image and determining from that first image whether the card is a foil card. If the card is not a foil card, then the method may further include taking a plurality of images wherein the point light source reflection 52c is at a plurality of positions across the surface area of the card. This may be accomplished, for example, by moving the point light source relative to a stationary card, or by moving the card relative to a stationary point source.

Alternatively, the point light source may be an array of point light sources, wherein each point light source within the array is spaced apart from one another, thereby producing a corresponding array of point light source reflections 52c that covers a substantial portion of the surface area of the card. A single image of a foil etched card, illuminated by the array of point light sources, may then be analysed following the methods described above, which method may optionally include masking the array of point light source reflections 52c from the image file, so as to only take into consideration any bright pixels that exceed the Value threshold in order to determine if the remaining pixels are direct bright reflections of a foil etched card, or principal maxima of a foil card.

A further alternative lighting arrangement may include a point light source that is a plurality of point light sources arranged in a line or a row, the line or row producing a corresponding line or row of point light source reflections that spans the length or width of the card's surface. Either the card or the line of point light sources may be moved relative to one another so as to scan the surface of the card, while taking a plurality of images as the line of point source reflections travels across the card's surface. The series of images may then be analysed to identify whether the card is a foil card, a foil etched card or a non-foil card, using the methods described elsewhere in the present disclosure.

It will be appreciated by a person skilled in the art that taking a plurality of images while moving the point light source and the card surface relative to one another, as described above, may include taking a video and analysing the resulting video images, using the methods described herein.

With reference to FIG. 9, when a foil etched card is illuminated by a point light source 52 and the card is positioned outside the field of view 52a of the point light source, it is possible that when a ray of light 52d from the point light source hits a foil portion 51 of the foil etched card, the ray of light 52d may be scattered away from the field of view 54a of the camera 54. When this occurs, the foil etched portion 51 of the card 50 appears to be absent from the image, because the light reflected from that portion of the card is not reflected into the image capture device or camera 54. For example, referring to FIGS. 11A and 11B, FIG. 11A is an image of a foil etched card 50 having a plurality of foil etched portions 51, and FIG. 11B is an image of a non-foil etched version of the same card depicted in FIG. 11A, having the features 53 of the card's artwork which do not have any foil. When comparing the images of the card in FIGS. 11A and 11B, which share the same artwork, it may be appreciated that the features 53 of the artwork (which are yellow-coloured scrolls), are visible in the non-foil etched card image of FIG. 11B, but the foil etched portions 51 of those same artwork features (which are gold-coloured foil etchings), in the card image of FIG. 11A, are either less visible or completely absent from that image.

Thus, in some embodiments, this phenomenon observed in the imaging of foil etched cards may be used to distinguish foil etched cards from non-foil cards, by comparing the images of the cards taken under the lighting conditions described above and depicted in FIG. 9 against a database of known card images containing images of diffusely lit cards, and when a feature of the card artwork is missing from the image file under analysis as compared to the database of known card images, the card under analysis may be identified as a foil etched card.

Condition Assessment Method

In another aspect of the present disclosure, a method for assigning a condition grading to a card is provided. As described above, in the trading card industry the value of a trading card is informed by the characteristics of the card, one of those characteristics being the condition of the card. Different grading scales and methods for grading the condition of a card may be used. However, for the purposes of illustration and not intending to be limiting, the condition grading for trading cards may include three or four grades indicating the relative condition of the card. For example, the condition of a card may be graded as being mint or near-mint condition, meaning that the card has not experienced any damage or wear and tear. A mint or near-mint condition is the best possible condition that a card can be in. Other condition grades may include a slightly played condition and a heavily played condition, whereby a slightly played condition indicates that the card has been lightly played and has experienced minimal wear and tear; whereas, a card graded as heavily played indicates that the card has experienced more substantial wear and tear damage due to use over a longer period of time. Other grading scales, including fewer or more than three levels or grades, also exist and may be utilized with the automated condition grading method described herein.

As appreciated by a person skilled in the art, there is a level of subjectivity that goes into assigning a condition grading to a card. However, the applicant has discovered that there are ways of analysing a digital image of the card, whereby objective criteria for assigning a grading condition may be applied to the card. Although this method may not provide for a definitive grading of the condition of a card, advantageously, this method provides for a relatively quick and simplified method of automatically assigning a condition grading to a card, thereby enabling a relatively quick sorting of a large batch of cards according to their approximate condition grading. Further advantageously, this method is based on focusing on a uniform portion of a card, rather than attempting to analyse the entire surface of the card, as is described in other methods known in the prior art.

In one embodiment of the present disclosure, a method for automated condition grading 200 comprises obtaining a digitized image file of an image of the trading card taken under diffuse lighting conditions. An example is shown in FIGS. 6A to 6L, with a near-mint condition card depicted in FIGS. 6A-6F and a heavily played card depicted in FIGS. 6G-6L. The image file may be produced by a specialized apparatus for the purpose of sorting and identifying trading cards, or else the image file may be obtained from a database or other sources. The image file includes an image of at least a portion of the trading card's surface. In one aspect, the image is preferably an image of the back or rear surface of the trading card, whereby the back surface image is consistent amongst all trading cards within a set of trading cards. For example, in the Magic: The Gathering™ trading card series, the rear image of every trading card consists of a black border which is solid in colour, the black border surrounding an image including the word "Magic" in stylized lettering above a group of five coloured spheres, such as shown in FIGS. 6A, 6G, 6M and 8B.

In one aspect, the method includes the step of masking or otherwise eliminating portions of the image which do not include the solid colour black border. In other words, the method works by analysing only the solid colour border of the rear surface of the card. In some embodiments, only a portion of the solid colour border may be analysed, such as shown by the unmasked areas in FIGS. 6B and 6H. Other trading card series, such as Pokémon™ trading cards, for example, may also have a solid colour border which is consistent across all rear images of the Pokemon™ card series. However, it will be appreciated by a person skilled in the art that the feature of the card image to be analysed is not necessarily limited to a solid colour border; for an example, another solid colour feature or any other feature that is common amongst all surfaces of the trading card series may provide the feature to be analysed in the presently described condition grading method.

Figure 3A:
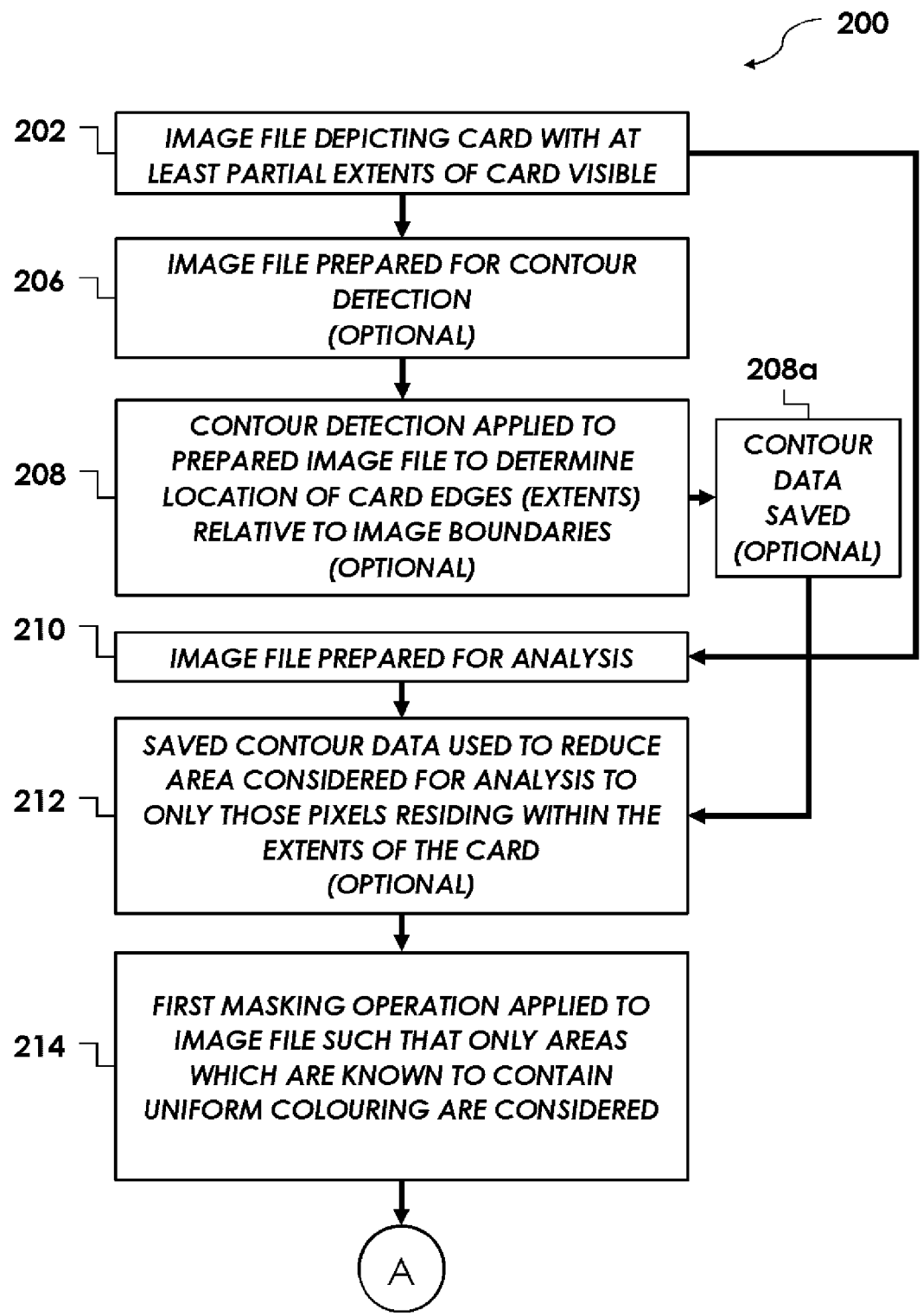
FIGS. 3A and 3B are a logic flow diagram depicting an embodiment of the method for identifying a grading category for a trading card, in accordance with the present disclosure.
Figure 3B:
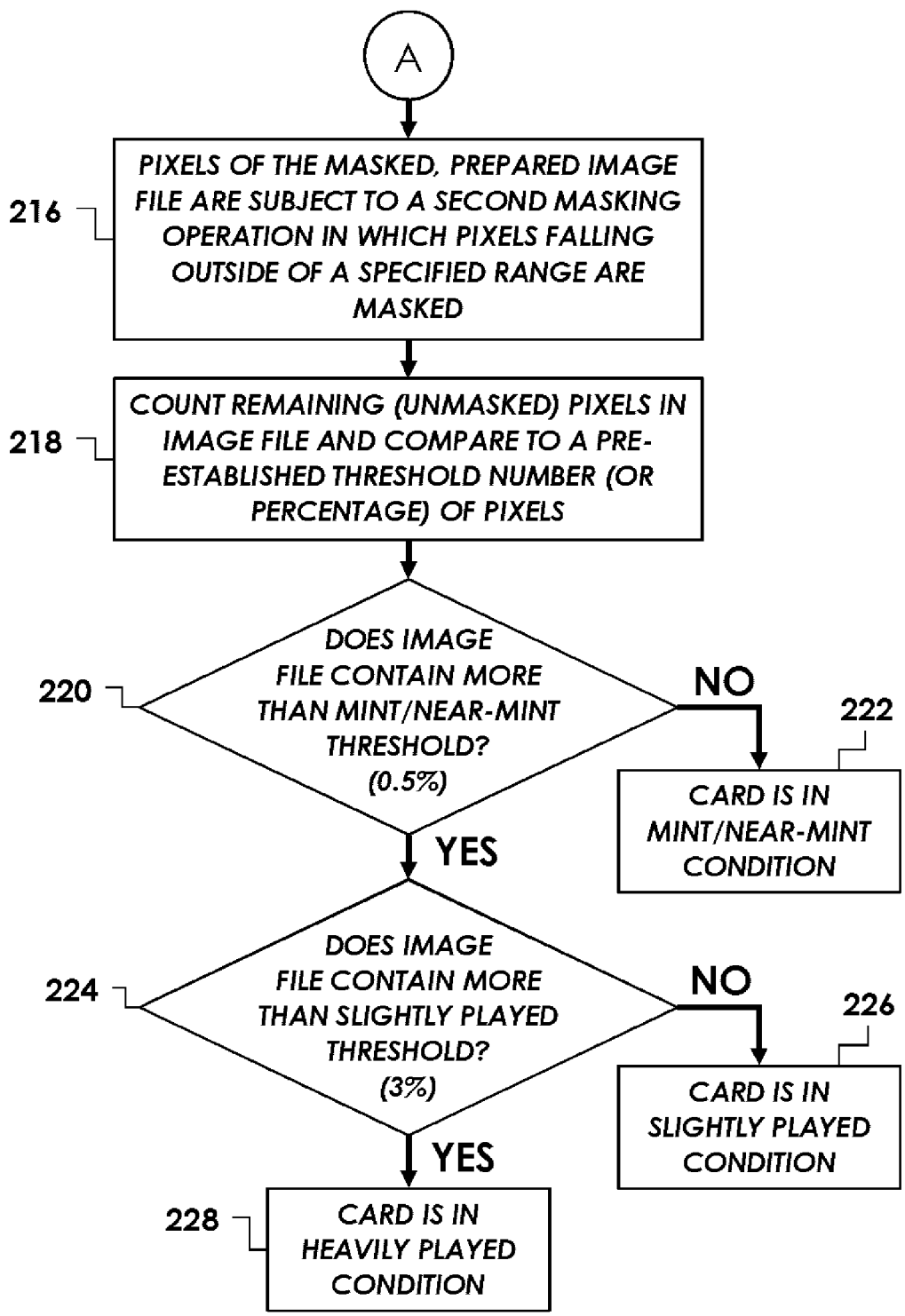

With reference to FIGS. 3A and 3B, an embodiment of the condition assessment method comprises obtaining an image file depicting a card, such as a rear surface of a trading card wherein at least a portion of the border 42 is visible, in step 202. In optional step 206, the image is converted to grayscale and prepared for contour detection, so as to define the outer boundaries of the card and the solid colour border of the card. In step 208, which is an optional step, contour detection may be applied to the prepared image to determine the location of the card extents relative to the boundaries of the image. In some embodiments, the contour detection routine applied to the image file may include the OpenCV Find Contours method, although it will be appreciated by a person skilled in the art that other methods or algorithms for contour detection may also be used and are intended to be included in the scope of the present disclosure. In optional step 208a, contour data that has been generated from the contour detection routine is saved.

In the next step, at 210, the (optionally) corrected image is prepared for analysis by converting the image to the HSV colour space. Step 210 may also include correcting spherical distortion of the image, although as in the foil detection methods described elsewhere in this disclosure, it is not necessary to perform spherical distortion correction in order to carry out the condition assessment methods described herein.

In step 212, the saved contour data is optionally used to reduce the area under consideration for the analysis of the image to only those pixels residing within the solid colour border of the card. Advantageously, this will simplify the analysis by excluding the irrelevant portions of the image file, including any surrounding environment depicted in the image, such as the platform or surface on which the trading card was positioned when the image was taken. However, step 212 is optional, and it will be appreciated by a person skilled in the art that the image file may still be analysed without excluding the irrelevant portions of the image file. Another optional step (not shown) would be to crop the image in the image file, so as to only include the solid colour border area of the card for further analysis.

In step 214, a first masking operation is applied to the image file, such that only areas of the card which are known to contain solid uniform colouring, such as the solid colour border 60 of the rear face of the card, are considered for analysis. Such masking may involve, for example, excluding all of the pixels that are outside the defined distance between the edge (extent) of the card and the inner surface of the base of the card. For example, in a Magic: The Gathering™ card, the solid colour border on the rear face of the card typically extends 0.5 cm inwardly from the extent of the card, around the entire extent of the card. Therefore, in this case, the masking may involve applying a mask 61 to all the pixels that fall outside of the 0.5 cm border 42 that runs around the extent of the card. In other embodiments, only a portion of the solid colour border may be considered in the analysis, such as the portion of the border that is unmasked 65 in FIGS. 6B, 6E, 6H and 6K.

Figure 6C:
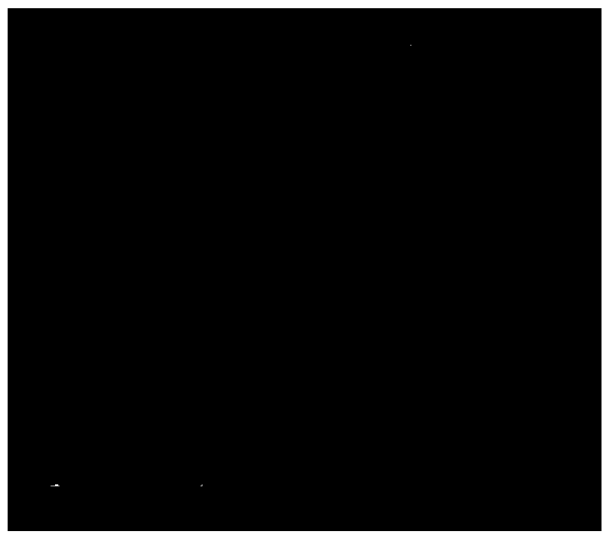
FIG. 6C is a converted image file of the near-mint card depicted in FIG. 6A, with masking applied so as to reveal only a portion of the extent of the card.
Figure 6B:
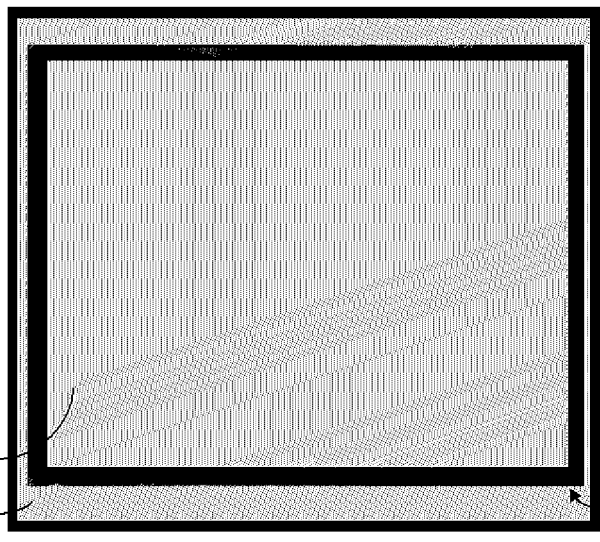
FIG. 6B is the near-mint card image file of FIG. 6A, with masking applied so as to reveal only a portion of the extent of the near-mint card.
Figure 6A:
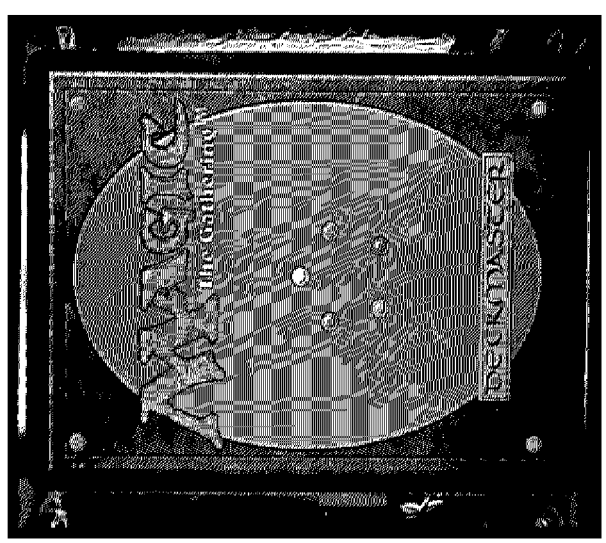
FIG. 6A is an example of an original image file of a card in a near-mint condition.
Figure 6I:
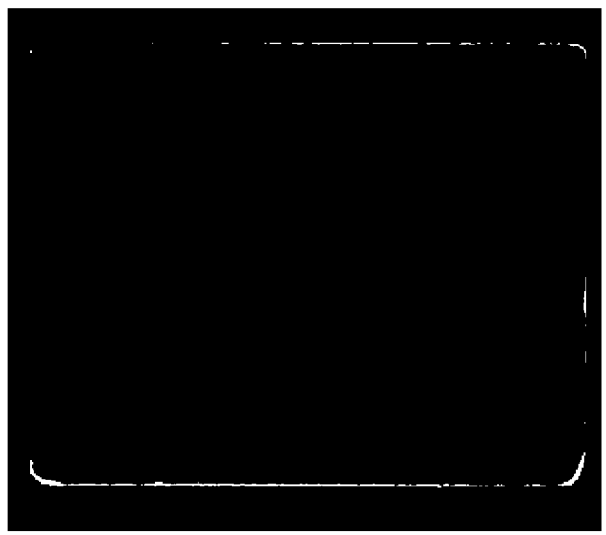
FIG. 6I is a converted image file of the heavily played card depicted in FIG. 6G, with masking applied so as to reveal only a portion of the extent of the card.
Figure 6H:
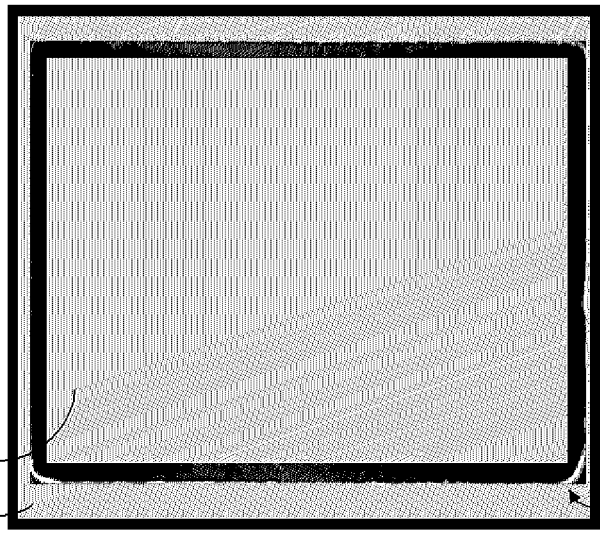
FIG. 6H is the heavily played card image file of FIG. 6G, with masking applied so as to reveal only a portion of the extent of the heavily played card.
Figure 6G:
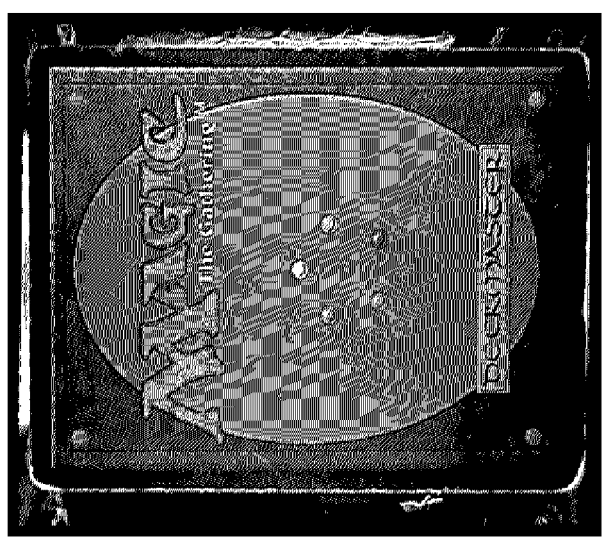
FIG. 6G is an example of an original image file of a card in a heavily played condition.
Figure 6R:
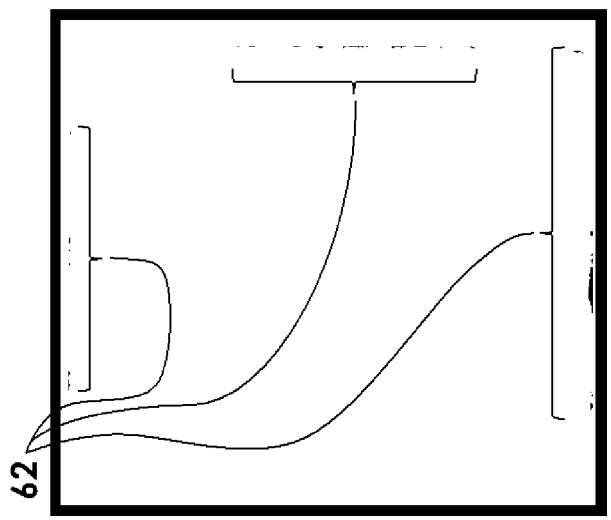
FIG. 6R is an image in which the colours of the image shown in FIG. 6Q have been inverted for clarity.

At step 216, a second masking operation is applied, wherein a Value mask is applied to exclude any pixels with a Value integer falling outside a predetermined range. The predetermined Value range may be, for example, the range of pixels having a Value integer between a lower Value threshold and the maximum attainable integer of 255 for a pixel. An example of the image produced after the second masking operation 216 is applied is shown in FIGS. 6C, 6F, 6I and 6L, whereby FIGS. 6C and 6I show the results of the second masking operation applied to the original image of the near-mint and heavily played cards, respectively, and FIGS. 6F and 6L show the inverted images of the FIGS. 6C and 6I, so as to make the results of the second masking operation more clearly visible. It will be appreciated that the inverted images shown in FIGS. 6F, 6L and 6R are not required for performing the methods described herein, but are merely included in the present disclosure for illustrative purposes.

The Value threshold may be selected so as to exclude all pixels that are below the Value threshold, thereby indicating pixels which are a part of the undamaged border, because such pixels are darker than the pixels falling within the predetermined Value range. Because a solid colour border is typically perceived as a darker colour, such as black or dark blue, pixels which fall outside of that dark Value range indicate pixels which form a portion of a damaged border, for example damage which shows portions of the dark coloured border that have been worn away through play, including but not limited to scratches, chips or scuff marks on the card. As best seen in FIGS. 6F and 6L, depicting the inverted images of the result of the second masking operation for the near-mint and heavily played cards, respectively, the damaged portion 62 of the near-mint card, in FIG. 6F, is barely visible, whereas the damaged portion 62 of the heavily played card, shown in FIG. 6L, is significant, appearing as several spots and vertical lines.

After applying the second masking operation in step 216, the method proceeds to step 218 wherein the number of remaining pixels under consideration is determined by counting the remaining pixels, and that number is then compared to a plurality of grading thresholds so as to assign a condition grading for that card. For example, in the routine that is shown in FIG. 3B, in step 220 a first threshold may be selected for indicating a mint or near-mint condition threshold. As an illustrative example, not intended to be limiting, if the relative number of remaining pixels is less than 0.5% of the total number of pixels under consideration, this would indicate that the border is relatively undamaged, due to the low proportion of pixels which are lighter than the solid colour border. Therefore, if the mint or near-mint threshold was set at 0.5%, the method at step 218 would inquire whether the number of remaining pixels exceeds the mint or near-mint threshold. In the case that the number of remaining pixels does not exceed the threshold, at step 222 the condition grading of mint or near-mint condition would be assigned to that card.

However, in the event that the number of remaining pixels does exceed the mint or near-mint threshold, set in this illustrative example at 0.5%, at step 224 the method will then query whether the image contains more pixels than the slightly played threshold. For example, without intending to be limiting, the slightly played threshold may be selected at 3% of the remaining pixels relative to the total number of pixels under consideration. In the case that the number of remaining pixels does not exceed the 3% threshold, then at step 226 the card would be assigned the slightly played condition grading. However, in the case that the number of remaining pixels does exceed the slightly played threshold, set for example at 3%, then the method proceeds to step 228 in which case that card would be assigned the heavily played condition grading.

It will be appreciated by a person skilled in the art that the examples of thresholds and condition gradings, discussed above, are provided for illustrative purposes only and are not intended to be limiting. For example, the setting of thresholds will depend on a number of factors, including the size of the area of the card under analysis, whether any portion of the area of the card under analysis is obscured by other objects in the image, such as rollers, and the number of condition gradings used to grade the condition of the cards. It will further be appreciated by a person skilled in the art that greater than three or less than three condition gradings may be determined through this method.

Figure 6Q:
FIG. 6Q is a converted image file of the card depicted in 6M, with the combination of the masking applied in FIGS. 6N and 6O.
Figure 6P:
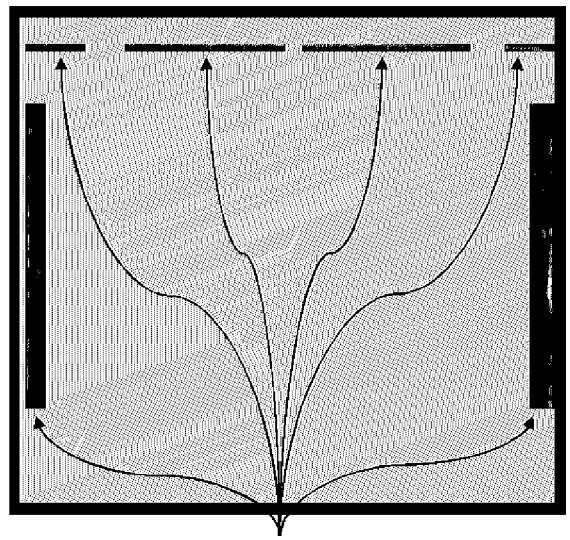
FIG. 6P is the combination of the masking applied in FIGS. 6N and 6O so as to reveal only a portion of the visible extent of the card depicted in FIG. 6M.

It will further be appreciated that the condition grading method described herein may be applied to only a portion of a feature that is uniform across all cards of a given card set, such as the example of the solid colour border described above for grading the condition of Magic: The Gathering™ cards. For example, as shown in FIGS. 6M to 6R, the condition grading method described herein may be applied to images of a card in which a portion of the solid colour border feature of the card is obscured by a pair of rollers 308, 308 (see FIG. 6M). In FIG. 6N, after the first masking operation is applied, the rollers 308 obscure part of the border 42. In such cases, as shown in FIG. 6O, a further, third masking operation may be applied so as to apply a mask 63 so as to remove the pixels of the image that comprise the rollers 308, 308. Then, the results of the first and third masking operations are combined to leave only the portions of the border 65 that are not obscured by the rollers 308, 308, as shown in FIG. 6P. The second masking operation is then applied to these portions of the border 65, wherein a Value mask is applied to exclude any pixels with a Value integer falling outside a predetermined range; the results of this second masking operation are shown in FIGS. 6Q and 6R, wherein FIG. 6R is an inverted version of the image of FIG. 6Q, and the damaged portions 62 of the card are shown as dots and lines, most clearly visible in the inverted image FIG. 6R.

Although the present disclosure discusses the conversion of the digital image file to an HSV colour space, as described above at step 110 of the foil detection method 100 or at step 210 of the card grading method 200, the use of the HSV colour space is provided as an illustrative example herein and it will be appreciated by a person skilled in the art that the methods described herein are not limited to use of the HSV colour space. For example, it will be appreciated that converting the digital image file to a colour space other than an HSV colour space, and then using the resulting colour space characteristics of each pixel to detect card damage and/or the presence of a foil card, may be utilized in the methods disclosed herein and is included in the scope of the present disclosure. Other colour spaces include, but are not limited to, any cylindrical colour model. The HSV colour space, described herein, is also known as the Hue, Saturation, Brightness ("HSB") colour space, the Hue, Saturation, Lightness ("HSL") colour space and the Hue, Saturation, Intensity ("HSI") colour space.

Card Sorting Apparatus

Figure 1:
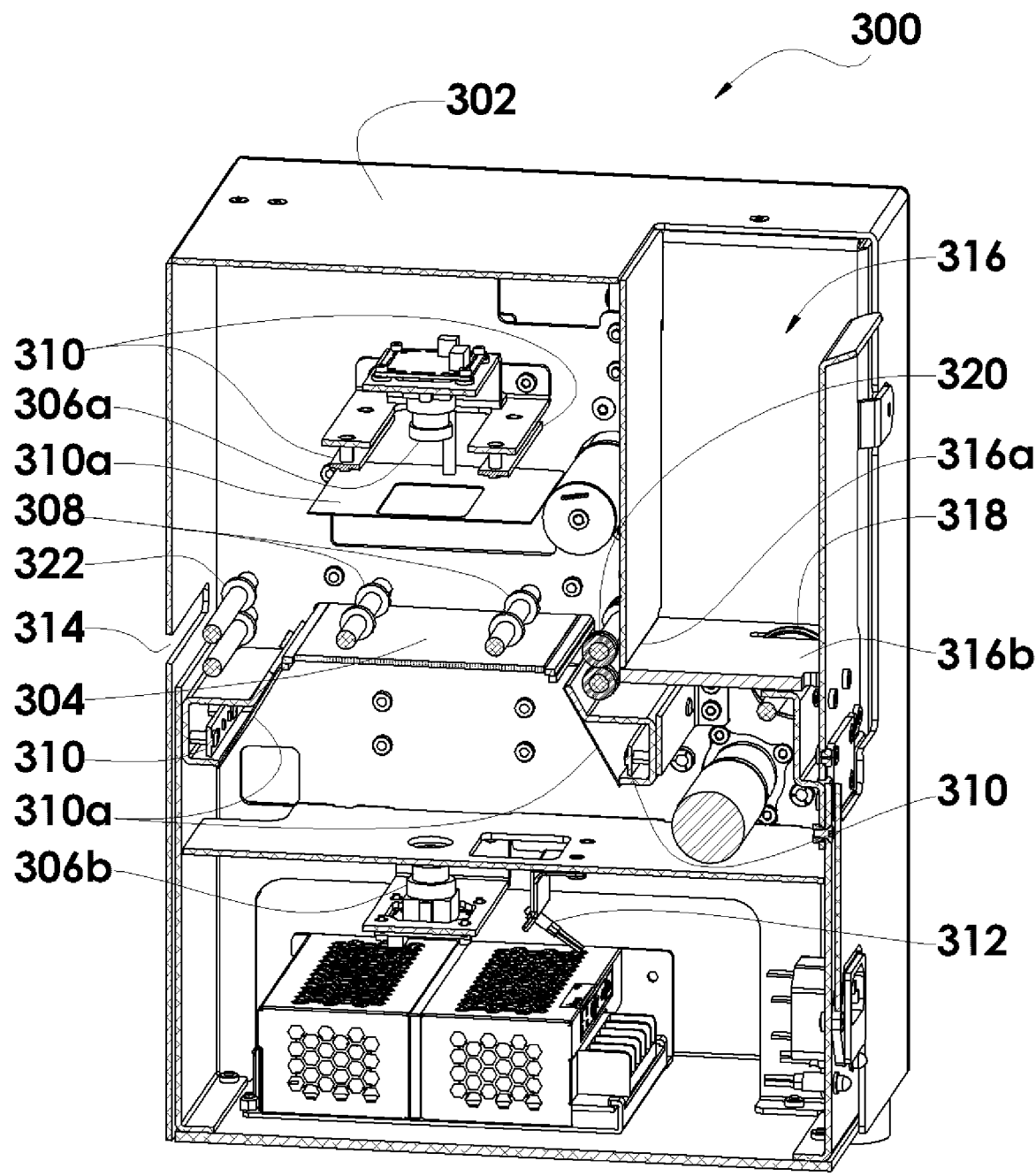
FIG. 1 is a partially cutaway view of an embodiment of the card sorting apparatus in accordance with the present disclosure.
Figure 7A:
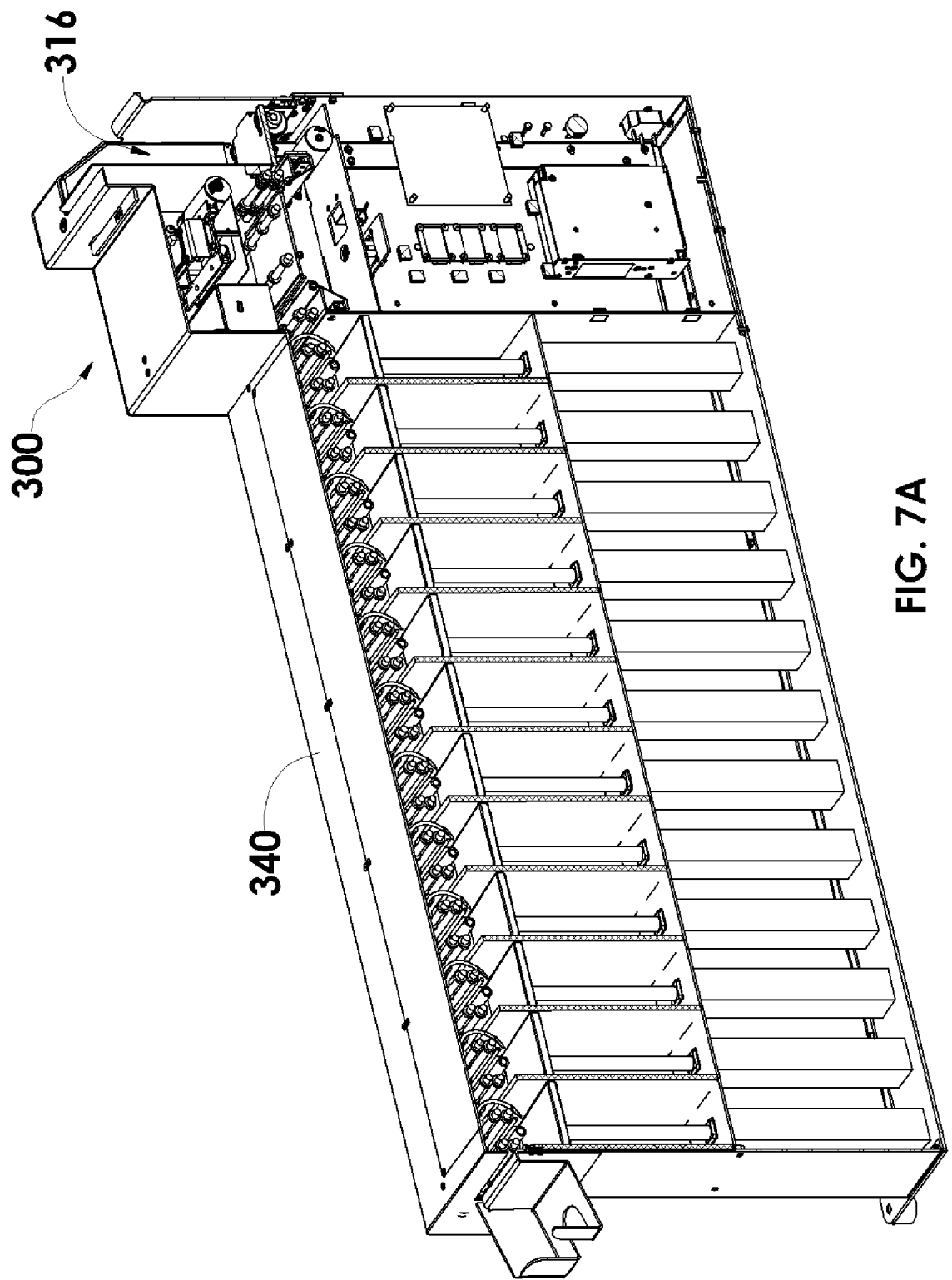
FIG. 7A is a partially cutaway perspective view of an embodiment of the card sorting apparatus including a sorting deck.
Figure 7B:
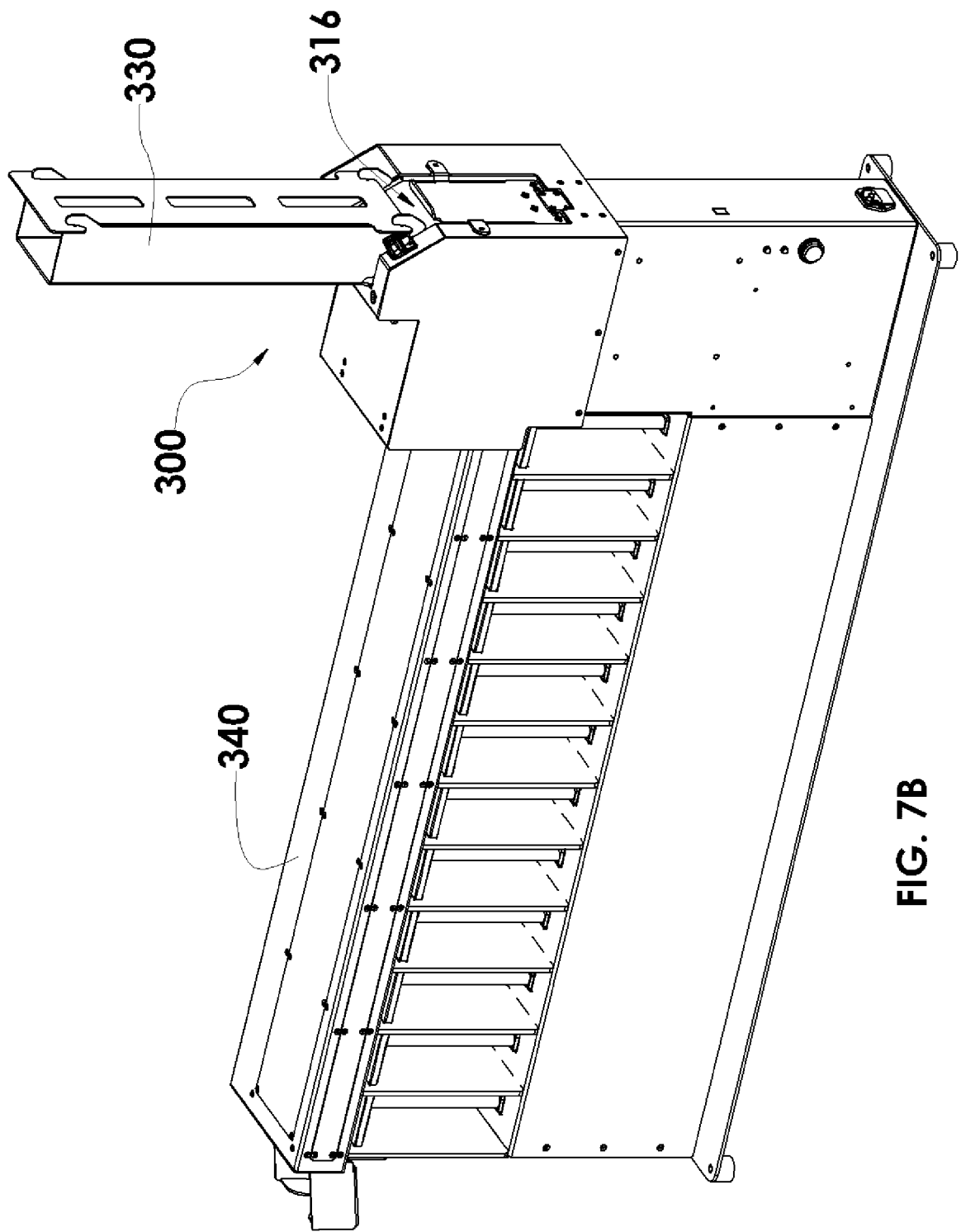
FIG. 7B is a perspective view of an embodiment of the card sorting apparatus including a sorting deck and a card hopper extension.

In another aspect of the present disclosure, a card sorting apparatus 300 is provided. With reference to FIGS. 1, 7A and 7B, the card sorting apparatus 300 includes an enclosure 302, the enclosure 302 being preferably constructed so as to exclude all external light sources from penetrating the enclosure, so that the lighting conditions within the card sorting apparatus 300 may be precisely controlled depending on whether diffuse lighting conditions or point light conditions are required. Within the enclosure 302, there is supported a platform 304. The platform 304 is preferably constructed of a transparent material, such as glass. The platform 304 is adapted for supporting trading cards to be imaged by an image capture device 306. The image capture device 306 may include, for example, a digital camera, or any other device suitable for capturing an image of a trading card. In a preferred embodiment, the card sorting apparatus 300 may include an upper camera 306a positioned above the platform 304, and a lower camera 306b positioned beneath the platform 304 for capturing the other side of the trading card when it is on the platform 304. Advantageously, this configuration of the card sorting apparatus enables for simultaneously taking an image of the upper and lower faces of the card.

In order to obtain clear images of the trading card, it is important to ensure that the card is entirely flat on the platform 304 when taking an image. This can be particularly challenging in respect of foil cards, as foil cards are commonly curled in one direction due to how humidity will impact the different layers of the card; for example, the foil layer as compared to the card stock layer of the card may expand or contract at different rates in different humidity conditions, thereby causing the card to curl. Therefore, in some embodiments of the card sorting apparatus 300, advantageously there is provided a plurality of rollers 308 positioned adjacent the platform, which rollers 308 are configured to press the trading card against the platform 304, thereby flattening the card against the platform 304 when an image is to be taken. Advantageously, for methods described herein in which it is important to run an analysis on a whole image of the trading card, whereby the trading card is not obscured, the lower camera 306b is able to take an image of an unobscured surface of the trading card, since the rollers 308 are positioned on the opposite side of the platform 304. Furthermore, for methods which do not require an unobscured image of the trading card, for example the condition grading method described herein, it does not matter that the pair of rollers 308 is obscuring a portion of the trading card surface when an image is taken by the upper camera 306a. Thus, the card sorting apparatus 300 may be utilized for performing more than one method described herein at the same time.

Advantageously, in some aspects of the present disclosure, lighting sources may also be supported within the enclosure 302, for illuminating the trading card when it is on the platform 304. For an example, a diffuse lighting source 310 may include a lighting source and a series of diffusion panels 310a. A point lighting source 312 may also be provided, positioned such that the card surface is outside a field of view of the point light source, for example as shown in the schematic drawing of FIG. 9.

In an embodiment of the present disclosure, advantageously the card sorting apparatus 300 further includes a conveyancing system and a card hopper. For example, a card hopper 316 is configured to receive a plurality of trading cards. Optionally, a card hopper extension 330 may be attached to the entrance of the card hopper 316 so as to add capacity to the card hopper 316, as shown in FIG. 7B. A set of driving rollers 318 are positioned so as to come through the floor 316b of the hopper 316, the driving rollers 318 configured to drive one trading card at a time through a narrow slot 316a through which the trading card passes to a second set of driving rollers 320. The rollers 320 convey the trading cards, one card at a time, to the platform 304, and then after one or more images of the trading card have been captured, for example by the cameras 306a, 306b, the rollers 308 convey the trading cards toward a third set of driving rollers 322 and then through the exit slot 314. The exit slot 314 may lead to a collection bin (not shown), or optionally, the exit slot 314 may lead to a sorting deck 340, such as shown in FIGS. 7A and 7B, as would be known to a person skilled in the art. A sorting deck 340 may be utilized to further sort the cards into certain categories; for example, not to be limiting, the sorting deck may sort the trading cards into foil and non-foil piles. As another example, not intended to be limiting, the sorting deck may sort the cards into two or more piles indicating the condition grading, card type, card price, card orientation, etc that has been assigned to each card. It will be appreciated by a person skilled in the art that the sorting deck may be used to sort the trading cards according to any number of characteristics of the trading cards, and the examples herein are not intended to be limiting.

What is claimed is:

1. A method for identifying a card containing foil, the method comprising:
   a. obtaining a first image file depicting a card, wherein the card is illuminated by a point light source and the card is positioned outside a field of view of the point light source;
   b. converting the first image file into a hue, saturation, value ("HSV") colour space;
   c. applying a value mask to the converted first image file so as to exclude a first group of pixels from analysis, each pixel of the first group of pixels having a value integer less than a predetermined foil threshold, said foil threshold selected to identify said first group of pixels that does not form an intensified brightness area of the first image file;

d. determining a number of remaining pixels and comparing the number of remaining pixels against a predetermined first threshold number of remaining pixels, wherein if the number of remaining pixels exceeds the predetermined first threshold number of remaining pixels the card is identified as a card containing foil.

2. The method of claim 1, wherein the method further comprises the steps of:
obtaining a second image file of the card, wherein the card is illuminated by a diffuse light source;
applying contour detection to the second image file so as to identify an extent of the card in the second image file and thereby generate a contour data set; and
applying the contour data set to the first image file so as to exclude a second group of pixels from analysis, the second group of pixels comprising pixels located outside the extent of the card depicted in the first image file.

3. The method of claim 2, wherein the method further comprises the step of correcting a spherical distortion of the first and second image files.

4. The method of claim 2, further comprising the steps of:
applying the contour data set to the second image file so as to identify an orientation of the card depicted in the second image file; and
correcting the orientation of the first and second image files to a selected orientation by rotating the first and second image files so as to re-orient the card depicted in the first and second image files in the selected orientation.

5. The method of claim 1, wherein the method further comprises the step of applying a light source mask to the converted first image file so as to exclude a third group of pixels, wherein each pixel of the third group of pixels forms a reflection of the point light source.

6. The method of claim 1, wherein the method further comprises the step of applying a light source mask to the converted first image file so as to exclude a third group of pixels, wherein each pixel of the third group of pixels has another value integer exceeding a predetermined light source threshold, said light source threshold selected to identify each pixel of the third group of pixels that forms a reflection of the point light source.

7. The method of claim 1, wherein the point light source includes a single point light source and an array of point light sources, each of the point light sources spaced apart from one another within the said array, and wherein the said array is reflected across substantially an entire surface area of the card, and
wherein the step of obtaining the first image file depicting the card includes obtaining the first image file wherein the card is illuminated by the single point light source and obtaining a second image file depicting the card wherein the card is illuminated by the array of point light sources; and
wherein, steps b, c and d of the method of claim 1 are performed on each of the first and second image files, and
wherein, if the first image file includes the intensified brightness area that is a principal maxima, the card is identified as a foil card; and
wherein, if the second image file includes the intensified brightness area that is one or more bright direct reflections, the card is identified as a foil etched card.

8. The method of claim 7, wherein the step of determining a number of remaining pixels and comparing the number of remaining pixels against the predetermined first threshold number of remaining pixels includes comparing the number of remaining pixels against a predetermined second threshold number of remaining pixels, wherein the predetermined first threshold number of remaining pixels is greater than the predetermined second threshold number of remaining pixels, and wherein, if the number of remaining pixels of the first image file exceeds the predetermined first threshold number of remaining pixels the card is identified as a foil card, and wherein, if the number of remaining pixels of the second image file is less than the predetermined first threshold number of remaining pixels but exceeds the predetermined second threshold number of remaining pixels, then the card is identified as a foil etched card.

9. The method of claim 1, wherein the step of applying the value mask to exclude the first group of pixels further includes applying at least a second mask, the at least a second mask selected from a group comprising: a hue mask; a saturation mask; and
wherein a predetermined threshold of any one of the hue mask and the saturation mask is selected to identify a pixel which does not form a portion of the intensified brightness area.

10. An apparatus for performing the method of claim 1, the apparatus comprising:
an imaging chamber, the imaging chamber substantially excluding any light from an external light source from entering the imaging chamber;
a platform positioned within the imaging chamber for supporting the card;
the point light source positioned within the imaging chamber such that the platform is positioned outside the field of view of the point light source; and
an image capture device for capturing an image of the card so as to generate the first image file.

11. The apparatus of claim 10, wherein the point light source includes a single point light source and an array of point light sources, each of the point light sources spaced apart from one another within the said array, and wherein the said array of point light sources is reflected across substantially an entire surface area of the card.

12. The apparatus of claim 10, wherein the point light source is a single point light source, and wherein one of the single point light source or the card is mounted to a mobile scanning stage, the mobile scanning stage actuated by an actuator so as to translate the single point light source or the card relative to one another so as to translate a reflection of the point light source across substantially an entire surface area of the card, and
wherein the first image file generated by the image capture device comprises a plurality of first image files, each first image file of the plurality of first image files depicting the card illuminated by the point light source at a plurality of different positions of the surface area of the card, and
wherein the intensified brightness area is selected from a group comprising: a bright direct reflection identifying that the card is an etched foil card, a principal maxima reflection identifying that the card is a foil card.

13. The apparatus of claim 12, wherein the single point light source is a line of single point light sources spaced apart from one another.

14. The apparatus of claim 10 further comprising a conveyancing system and a card hopper, the conveyancing system conveying a plurality of cards, one card at a time, from the card hopper to the platform.

15. The apparatus of claim 14, wherein the conveyancing system further conveys the plurality of cards, one card at a time, from the platform to a sorting deck; and
wherein the plurality of cards may be sorted at the sorting deck according to at least one characteristic of each card, the characteristic identified by an analysis of at least the first image file of each card.

16. The apparatus of claim 15, wherein the at least one characteristic is selected from a group comprising: card type, card orientation, card containing foil, card price, condition grading.

17. The apparatus of claim 10, wherein the platform comprises a transparent material, and wherein the image capture device includes a first camera positioned above the platform and a second camera positioned below the platform, the first camera arranged to take a first image of a first side of the card to generate the first image file and the second camera arranged to take a second image of a second side of the card to generate a third image file.

18. A method for assigning a condition grading to a card, the method comprising:
a. obtaining an image file depicting a diffusely illuminated card, the image file depicting at least a portion of an extent of the card;
b. converting the image file into a hue, saturation, value ("HSV") colour space;
c. eliminating a nonuniform portion of the converted image file from analysis so as to isolate a uniform portion of the converted image file;
d. applying a value mask to the converted image file so as to exclude a first group of pixels of the uniform portion of the image file from analysis, each pixel of the first group of pixels having a value integer less than a predetermined condition threshold, wherein the condition threshold is selected to identify said first group of pixels representing an undamaged card portion; and
e. determining a number of remaining pixels and comparing the number of remaining pixels against a plurality of grading thresholds so as to assign a condition grading of the card.

19. The method of claim 18, wherein the method further comprises the step of applying contour detection to the image file to identify said at least a portion of the extent of the card in the image file and thereby generate a contour data set delineating said extent; and
applying the contour data set to the image file so as to reduce the image file to a border group of pixels, said border group of pixels located proximate the extent of the card.

20. The method of claim 19, wherein the method further comprises the step of correcting a spherical distortion of the image file.

21. The method of claim 20, wherein the border group of pixels is defined as an area of the card consisting of pixels having substantially uniform HSV characteristics as compared to adjacent pixels when the card is a mint condition specimen.

22. The method of claim 19, wherein the image file consists of an image of a rear face of the card, the card belonging to a set of cards wherein the rear face of each card in the set of cards comprises a substantially identical image.

23. The method of claim 18, wherein the step of applying the value mask to the first group of pixels further includes applying at least a second mask, the at least a second mask selected from a group comprising: a hue mask, a saturation mask; and
wherein a predetermined threshold of any one of the hue mask and the saturation mask is selected to identify a pixel that forms the uniform portion of the converted image file.

24. The method of claim 18, wherein the plurality of grading thresholds includes at least a near-mint threshold and a slightly played threshold; and
wherein, when the number of remaining pixels is less than or equal to the near-mint threshold, the card is assigned a near-mint condition grading; and
wherein, when the number of remaining pixels is greater than the near-mint threshold and less than or equal to the slightly played threshold, the card is assigned a slightly played condition grading; and
wherein, when the number of remaining pixels is greater than the slightly played threshold, the card is assigned a heavily played condition grading.

25. An apparatus for performing the method of claim 18, the apparatus comprising:
an imaging chamber, the imaging chamber substantially excluding any light from an external light source from entering the imaging chamber;
a platform positioned within the imaging chamber for supporting the card;
a diffuse light source, the diffuse light source positioned within the imaging chamber to illuminate the card; and
an image capture device for taking an image of the card so as to generate the image file.

26. A method for identifying characteristics of a trading card, the method comprising:
a. obtaining a first image file depicting a card, wherein the card is illuminated by a point light source and the card is positioned outside a field of view of the point light source;
b. converting the first image file into a hue, saturation, value ("HSV") colour space;
c. applying a first value mask to the converted first image file so as to exclude a first group of pixels from analysis, each pixel of the first group of pixels having a first value integer less than a predetermined foil threshold, said foil threshold selected to identify said first group of pixels that does not form an intensified brightness area of the first image file;
d. determining a first number of remaining pixels and comparing the first number of remaining pixels against a predetermined foil threshold number of remaining pixels, wherein if the first number of remaining pixels exceeds the predetermined foil threshold number of remaining pixels the card is identified as a card containing foil;
e. obtaining a second image file depicting the card, wherein the card is illuminated by a diffuse light source, the second image file depicting at least a portion of an extent of the card;
f. converting the second image file into a hue, saturation, value ("HSV") colour space;
g. eliminating a nonuniform portion of the converted second image file from analysis so as to isolate a uniform portion of the converted second image file;
h. applying a second value mask to the isolated uniform portion of the converted second image file so as to exclude a second group of pixels of the uniform portion of the second image file from analysis, each pixel of the second group of pixels having a second value integer less than a predetermined condition threshold, wherein the condition threshold is selected to identify said second group of pixels representing an undamaged card portion; and i. determining a second number of remaining pixels and comparing the second number of remaining pixels against a plurality of grading thresholds so as to assign a condition grading of the card.

27. The method of claim 26, wherein the method further comprises the steps of:
applying contour detection to the second image file so as to identify an extent of the card in the second image file and thereby generate a contour data set; and
applying the contour data set to the second image file so as to exclude a third group of pixels from analysis, the third group of pixels comprising pixels located outside the extent of the card depicted in the second image file.

28. The method of claim 26, wherein the method further comprises the step of correcting a spherical distortion of the first and second image files.

29. The method of claim 27, further comprising the steps of:
applying the contour data set to the second image file so as to identify an orientation of the card depicted in the first image file; and
correcting the orientation of the first and second image files to a selected orientation by rotating the first and second image files so as to re-orient the card depicted in the first and second image files in the selected orientation.

30. The method of claim 26, wherein the method further comprises the step of applying a light source mask to the first image file so as to exclude a third group of pixels, wherein each pixel of the third group of pixels forms a reflection of the point light source.

31. The method of claim 26, wherein the method further comprises the step of applying a light source mask to the first image file so as to exclude a third group of pixels, wherein each pixel of the third group of pixels has a third value integer exceeding a predetermined light source threshold, said light source threshold selected to identify each pixel of the third group of pixels that forms a reflection of the point light source.

32. The method of claim 26, wherein the step of applying a first value mask to the converted first image file to exclude the first group of pixels from analysis further includes applying at least a second mask, the at least a second mask selected from a group comprising: a hue mask; a saturation mask; and
wherein a predetermined threshold of any one of the hue mask and the saturation mask is selected to identify a pixel which does not form a portion of the intensified brightness area.

33. The method of claim 26, wherein the method further comprises the step of applying contour detection to the second image file to identify said at least a portion of the extent of the card in the second image file and thereby generate a contour data set delineating said extent; and
applying the contour data set to the second image file so as to reduce the second image file to a border group of pixels, said border group of pixels located proximate the extent of the card.

34. The method of claim 33, wherein the border group of pixels is defined as an area of the card consisting of pixels having substantially uniform HSV characteristics as compared to adjacent pixels when the card is a near-mint condition specimen.

35. The method of claim 26, wherein the second image file consists of an image of a rear face of the card, wherein the rear face of each card in a set of cards comprises a substantially identical image.

36. The method of claim 26, wherein the plurality of grading thresholds includes at least a near-mint threshold and a slightly played threshold; and
wherein when the number of remaining pixels is less than or equal to the near-mint threshold, the card is assigned a near-mint condition grading; and
wherein when the number of remaining pixels is greater than the near-mint threshold and less than or equal to the slightly played threshold, the card is assigned a slightly played condition grading; and
wherein when the number of remaining pixels is greater than the slightly played threshold, the card is assigned a heavily played condition grading.

37. An apparatus for performing the method of claim 26, the apparatus comprising:
an imaging chamber, the imaging chamber substantially excluding any light from an external light source from entering the imaging chamber;
a platform positioned within the imaging chamber for supporting the card;
the point light source positioned within the imaging chamber such that the platform is positioned outside the field of view of the point light source;
the diffuse light source positioned within the imaging chamber to illuminate the card;
an image capture device for capturing an image of the card so as to generate the first and second image files.

38. The apparatus of claim 37 wherein the platform comprises a transparent material, and wherein the image capture device includes a first camera positioned above the platform and a second camera positioned below the platform, the first camera arranged to take first and second images of a first side of the card and the second camera arranged to take first and second images of a second side of the card, wherein the first images of the first and second sides of the card depicts the card illuminated by the point light source and the second images of the first and second sides of the card depict the card illuminated by the diffuse light source.

* * * * *